United States Patent
Ogawa

(10) Patent No.: US 9,336,447 B2
(45) Date of Patent: May 10, 2016

(54) AMBIENT ENVIRONMENT DETERMINATION APPARATUS

(71) Applicant: Fuji Jukogyo Kabushiki Kaisha, Tokyo (JP)

(72) Inventor: Genya Ogawa, Tokyo (JP)

(73) Assignee: FUJI JUKOGYO KABUSHIKI KAISHA, Shibuya-Ku, Tokyo (JP)

( * ) Notice: Subject to any disclaimer, the term of this patent is extended or adjusted under 35 U.S.C. 154(b) by 237 days.

(21) Appl. No.: 14/290,330

(22) Filed: May 29, 2014

(65) Prior Publication Data

US 2014/0355827 A1    Dec. 4, 2014

(30) Foreign Application Priority Data

May 29, 2013  (JP) ................. 2013-112595

(51) Int. Cl.
  *G06K 9/00*   (2006.01)
  *G06K 9/32*   (2006.01)
  *B60Q 1/14*   (2006.01)

(52) U.S. Cl.
  CPC ............ *G06K 9/00791* (2013.01); *B60Q 1/143* (2013.01); *G06K 9/00825* (2013.01); *G06K 9/3241* (2013.01); *B60Q 2300/056* (2013.01); *B60Q 2300/112* (2013.01); *B60Q 2300/142* (2013.01); *B60Q 2300/332* (2013.01); *B60Q 2300/3321* (2013.01); *B60Q 2300/41* (2013.01); *B60Q 2300/42* (2013.01); *G06K 2209/21* (2013.01)

(58) Field of Classification Search
  None
  See application file for complete search history.

(56) References Cited

U.S. PATENT DOCUMENTS

2010/0052550 A1 *  3/2010  Kobayashi ................ 315/158

FOREIGN PATENT DOCUMENTS

| JP | 2005-225317 A | 8/2005 |
| JP | 2008-33750    | 2/2008 |
| JP | 2008-165326 A | 7/2008 |
| JP | 2009-61812    | 3/2009 |
| JP | 2012-020662 A | 2/2012 |
| JP | 2012-242218 A | 12/2012 |

OTHER PUBLICATIONS

Japanese Office Action dated Apr. 14, 2015 issued in corresponding Japanese Patent Application No. 2013-112595.

* cited by examiner

*Primary Examiner* — Stephen R Koziol
*Assistant Examiner* — Raphael Schwartz
(74) *Attorney, Agent, or Firm* — Troutman Sanders LLP

(57) ABSTRACT

In an ambient environment determination apparatus, an imager obtains a picture capturing an area ahead of a vehicle, and a street lamp is detected for each detection frame unit of the picture. Then, an urban area determination process is performed that determines whether or not the ambient environment of the vehicle is an urban area based on both of a street lamp detection result of a current detection frame unit and a street lamp detection result of a past detection frame unit of the picture. Further, in a period after the vehicle turns right or left, determination responsiveness with regard to determination whether or the ambient environment is a urban area or a non-urban area is enhanced than that in a period other than the period after the right or left turn.

13 Claims, 14 Drawing Sheets

G1 (BRIGHT IMAGE)

G2 (DARK IMAGE)

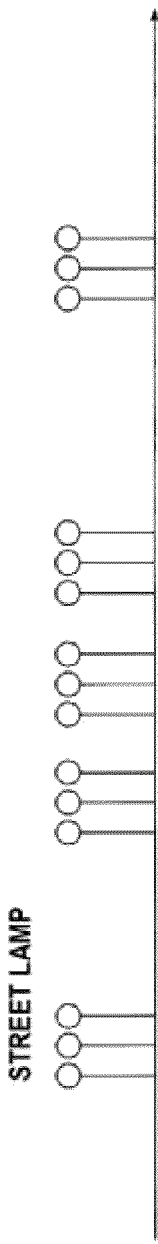
FIG. 13A
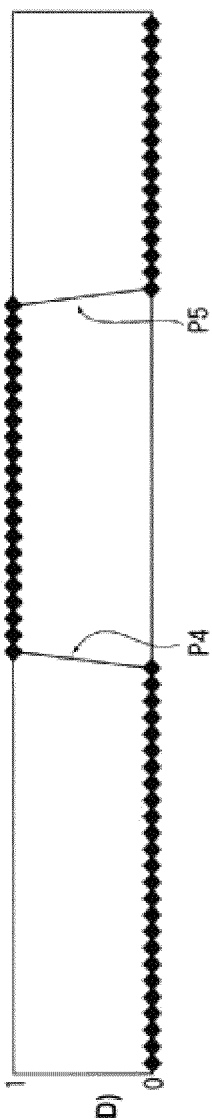
FIG. 13B URBAN AREA DETERMINATION (RESPONSIVENESS IS NOT CHANGED)
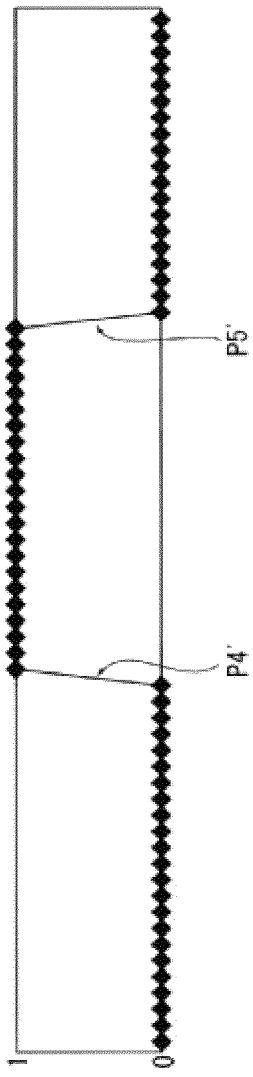
FIG. 13C URBAN AREA DETERMINATION (RESPONSIVENESS IS CHANGED)

AMBIENT ENVIRONMENT DETERMINATION APPARATUS

CROSS-REFERENCE TO RELATED APPLICATIONS

The present application claims priority from Japanese Patent Application No. 2013-112595 filed on May 29, 2013, the entire contents of which are hereby incorporated by reference.

BACKGROUND

1. Technical Field

The present invention relates to ambient environment determination apparatus to determine an ambient environment of a vehicle, in particular, whether the ambient environment is an urban area or a non-urban area.

2. Related Art

When a high beam of a headlight of a vehicle irradiated to a preceding vehicle and an oncoming vehicle, the drivers of the preceding and oncoming vehicles are dazzled by the high beam, which may disturb the drivers in their driving. In order to prevent this, so-called Auto High Beam (AHB) and Adaptive Driving Beam (ADB) are known as light distribution control of the headlight. In performing this light distribution control of the headlight, it is required to recognize the preceding vehicle and the oncoming vehicle existing ahead of the vehicle and recognize whether or not an ambient environment is a running scene in which the high beam of the headlight is acceptable.

A criteria for determining whether or not the high beam may be used in the running scene is whether or not the ambient environment is the urban area or the non-urban area. For example, the AHB by which the high beam is automatically turned on and off regards the high beam as unrequired in the urban area (a scene in which it is sufficiently bright around the neighborhood) and prevents glaring on drivers of vehicles in the neighborhood.

According to a technique described in Japanese Unexamined Patent Application Publication (JP-A) No. 2009-61812, a camera detects a street lamp. When the number of street lamps detected within a certain time exceeds a certain number, and when a time in which the street lamp is detected within a certain period exceeds a certain time, the ambient environment is determined to be an urban area, hence a high-beam nonrequired scene.

In this case, when running environment such as the urban area and the non-urban area is changed, it is preferable to make a determination as quickly as possible to thereby perform accurate light distribution control of the headlight quickly.

On the other hand, in a case where responsiveness of determining whether the running environment is the urban area or the non-urban area is set to be too quick, when temporarily passing through an area where many street lamps and the like are installed in the non-urban area and when entering a situation in which the street lamp cannot be temporarily detected in the urban area, a determination result may fluctuate needlessly, which is not appropriate.

SUMMARY OF THE INVENTION

The present invention has been designed in consideration of the circumstances described above, and an object thereof is to make a determination as to whether a running environment is an urban area or a non-urban area stably and quickly according to a change in environment.

An aspect of the present invention provides an ambient environment determination apparatus including: an imager that obtains a picture capturing an area ahead of a vehicle; a detection processor that detects at least a street lamp for each detection frame unit of the picture; and an environment determination processor that performs an urban area determination process of determining whether or not the ambient environment of the vehicle is an urban area based on both of a street lamp detection result of a current detection frame unit and a street lamp detection result of a past detection frame unit in the picture. In a period after the vehicle turns right or left, the environment determination processor enhances determination responsiveness with regard to the determination whether the ambient environment is the an area or an non-urban area, than that in a period other than the period after the right or left turn.

Preferably, the environment determination processor should not update an urban area determination result while the vehicle is stopped.

Preferably, the environment determination processor should enhance the determination responsiveness by lowering a reflection level of the street lamp detection result of the past detection frame unit in the period after the vehicle turns right or left.

Preferably, the environment determination processor should enhance the determination responsiveness by lowering a threshold value to be compared with a value of the street lamp detection result in the period after the vehicle turns right or left.

Preferably, in the urban area determination process, the ambient environment should be determined to be the urban area when a value obtained by averaging, with predetermined weighting, a value of the street lamp detection result of the current detection frame unit and a value of the street lamp detection result of the past detection frame unit, is equal to or more than a predetermined threshold value.

Preferably, the ambient environment should be determined to be the non-urban area when the ambient environment is determined as the urban area and afterwards the value of a street lamp detection result of each frame detection unit is equal to or less than a threshold value for a non-urban area determination consecutively a predetermined number of times.

Preferably, the ambient environment determination apparatus should further include a light distribution controller to perform control so as not to execute high beam irradiation of a headlight when the environment determination processor determines that a current ambient environment of a vehicle is the urban area.

BRIEF DESCRIPTION OF THE DRAWINGS

FIG. 13A to FIG. 13C are explanatory diagrams of changing responsiveness when turning right or left in an urban area determination process according to the implementation.

DETAILED DESCRIPTION

1. Entire Configuration of System

Figure 1:
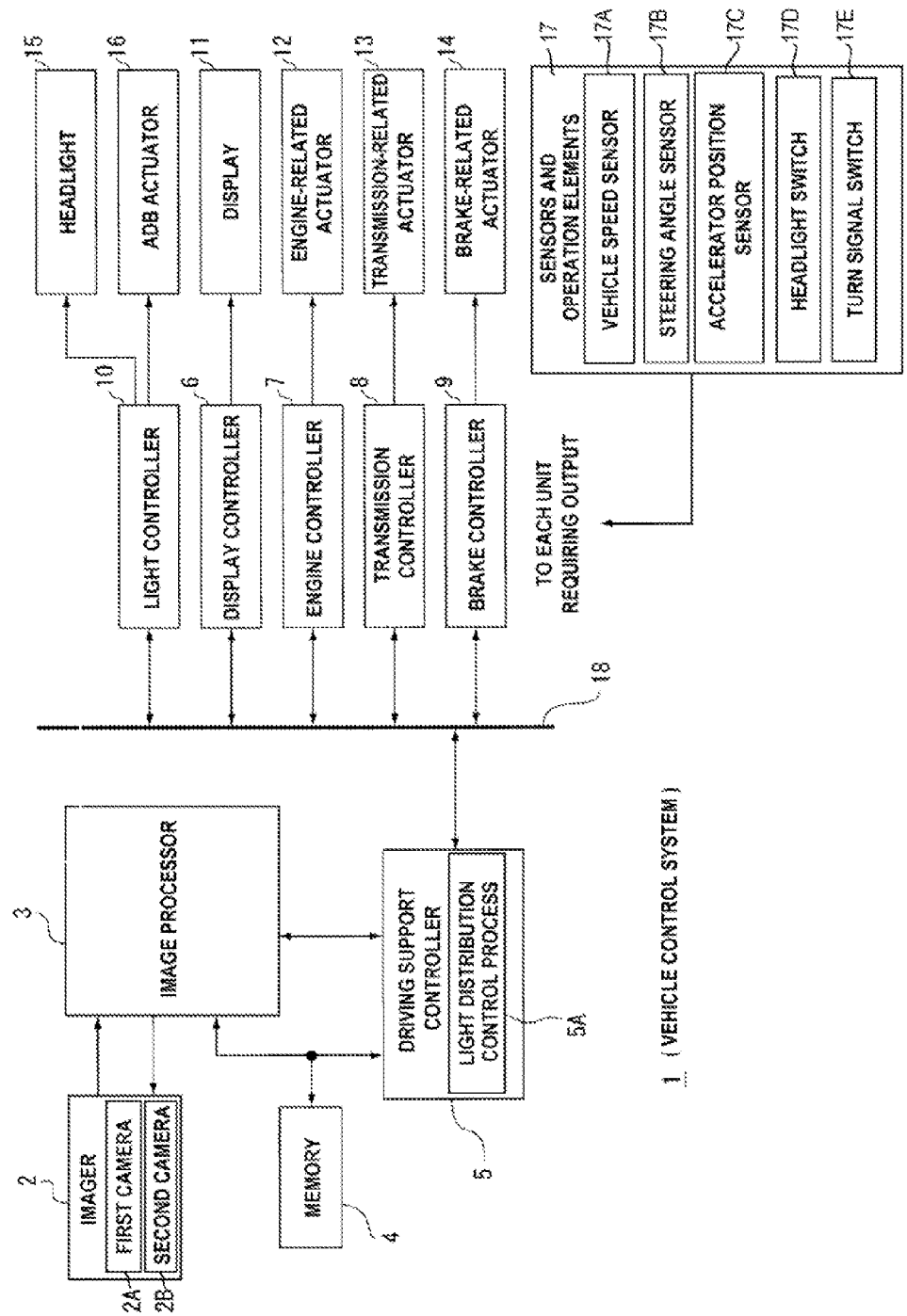
FIG. 1 is a block diagram of a vehicle control system according to an implementation of the present invention.

FIG. 1 illustrates a configuration of a vehicle control system 1 including an ambient environment determination apparatus according to an implementation of the present invention. FIG. 1 illustrates only main components the vehicle control system 1. The ambient environment determination apparatus in the implementation is realized mainly by an imager 2 and an image processor 3 in the drawing.

The vehicle control system 1 includes the imager 2, the image processor 3, a memory 4, a driving support controller 5, a display controller 6, an engine controller 7, a transmission controller 8, a brake controller 9, a light controller 10, a display 11, an engine-related actuator 12, a transmission-related actuator 13, a brake-related actuator 14, a headlight 15, an Adaptive Driving Beam (ADB) actuator 16, sensors and operators 17, and a bus 18. These components are installed for a vehicle.

The imager 2 includes a first camera 2A and a second camera 2B which are installed to be capable of capturing an area in a traveling direction (ahead) of a vehicle.

The first camera 2A and the second camera 2B are disposed, for example, at a predetermined interval in the vehicle width direction around an upper part of a windshield of the vehicle so as to enable ranging by a so-called stereo method. Optical axes of the first camera 2A and the second camera 2B are set to be parallel and focal lengths of the first camera 2A and the second camera 2B are set to be a same value. Frame periods thereof are synchronized and frame rates thereof are matched with each other. The pixel number of imaging devices thereof is, for example, around 640×480.

Each of electric signals (picture signals) obtained by each imaging device of the first camera 2A and the second camera 2B is converted from analog to digital to be a digital image signal (picture data) indicating a luminance value in a predetermined grayscale per pixel unit. In the present implementation, each of the picture data is set to be color picture data, and therefore, three pieces of data (luminance values) of R (red), G (green), and B (blue) can be obtained per one pixel. The grayscale of the luminance values are set to be, for example, 256 shades.

Hereinafter, picture data obtained by the first camera 2A are mentioned as "first picture data" and picture data obtained by the second camera 2B are referred to as "second picture data".

The imager 2 in the present implementation has an automatic adjustment function for a shutter speed and a gain (an ISO sensitivity) of each of the first camera 2A and the second camera 2B. Further, the imager 2 is configured to be capable of adjusting the shutter speed and the gain of each of the first camera 2A and the second camera 2B on the basis of an instruction from the image processor 3.

The image processor 3 mainly has a microcomputer including, for example, a Central Processing Unit (CPU), a Read Only Memory (ROM), and a Random Access Memory (RAM) serving as a work area, and executes various types of processes according to a program stored in the ROM.

The image processor 3 uses the memory 4 to store each of frame picture data as the first picture data and the second picture data obtained by capturing an area ahead of the vehicle by the imager 2. Then, the image processor 3 executes various types of processes to recognize an object existing ahead of the vehicle as external environment on the basis of the first picture data and the second picture data of each frame.

The process executed by the image processor 3 will be described in detail below.

The driving support controller 5 is has, for example, a microcomputer and executes various types of control processes for driving support on the basis of a result of image processing by the image processor 3 and detection information, operation input information, and the like obtained by the sensors and operators 17.

The driving support controller 5 is connected with each controller of the display controller 6, the engine controller 7, the transmission controller 8, the brake controller 9, and light controller 10, each of which also has a microcomputer, via the bus 18, and is configured to be capable of performing two-way data communication with each of these controllers. The driving support controller 5 instructs a required controller of the controllers to execute an operation related to driving support.

In the present implementation, the driving support controller 5 controls light distribution for the headlight 15. In the drawings, a process function for controlling light distribution included in the driving support controller 5 is indicated by a function block as a "light distribution control processor 5A". The light distribution control processor 5A gives instructions for ADB control and AHB control to the light controller 10 on the basis of control information generated by the image processor 3 from a result of the recognition of an oncoming vehicle, a preceding vehicle, a street lamp, and the like.

The sensors and operators 17 comprehensively indicate various types of sensor and operators installed in the vehicle. The sensors of the sensors and operators 17 include, for example, an engine speed sensor, an intake air amount sensor to detect an intake air amount, an accelerator position sensor to detect an accelerator position from a depressed amount of an accelerator pedal, a throttle position sensor installed on an intake air path to detect a position of a throttle value that adjusts an amount of intake air to be supplied to each cylinder of an engine, a water temperature sensor to detect a temperature of coolant indicating an engine temperature, and an outside air temperature sensor to detect an air temperature outside the vehicle.

Further, the operators include an ignition switch to instruct the start and stop of the engine, a select lever to select between an automatic gear shift mode and a manual gear shift mode and to instruct shift-up and shift-down in the manual gear shift mode of an automatic transmission (AT) vehicle, a display selector switch to select display information in a multi function display (MFD) installed in the display 11 to be described later, and the like.

In particular, the sensors and operators 17 of the present implementation include a vehicle speed sensor 17A, a steering angle sensor 17B, an accelerator position sensor 17C, a headlight switch 17D, and a turn signal switch 17E.

The headlight switch 17D indicates an operator to give instructions of turning on and off a low beam and turning on and off the high beam of the headlight 15. In the present example, an ADB function is also turned on and off according to an operation of turning on and off the high beam.

The display 11 comprehensively indicates various types of meters such as a speed meter and a tachometer provided in an instrument panel installed in front of a driver, a MFD, and other display devices to provide information to the driver. The MFD is configured to be capable of displaying various types of information such as the total mileage, an outside air temperature, and instantaneous fuel economy of the vehicle simultaneously or by switching the information pieces.

The display controller 6 controls a display operation of the display 11 on the basis of a detection signal from a predetermined sensor in the sensors and operators 17, operation input information by the operators, and the like.

The engine controller 7 controls various types of actuators installed as engine-related actuators 12 on the basis of a detection signal from a predetermined sensor in the sensors and operators 17, operation input information by an operators, and the like. The engine-related actuator 12 includes, for example, a throttle actuator to drive a throttle valve and various types of actuators related to driving the engine such as an injector to inject fuel.

For example, the engine controller 7 controls the start and stop of the engine in response to the operation of the ignition switch described above. Further, the engine controller 7 also controls a fuel injection timing, a fuel injection pulse width, a throttle position, and the like on the basis of a detection signal from a predetermined sensor such as the engine speed sensor and the accelerator position sensor.

The transmission controller 8 controls various types of actuators serving as the transmission-related actuator 13 on the basis of a detection signal from a predetermined sensor in the sensors and operators 17, operation input information by an operator, and the like. The transmission-related actuator 13 includes, for example, various types of actuators related to a transmission such as a control valve to perform gear shift control of an automatic transmission and a lock-up actuator to cause a lock-up clutch to perform a lock-up operation.

For example, the transmission controller 8 performs gear shift control by outputting a gear shift signal to the control valve according to a predetermined gear shift pattern when the automatic gear shift mode is selected by the select lever described above. Further, the transmission controller 8 performs gear shift control by outputting, to the control valve, a gear shift signal according to the instruction of shift-up and shift-down by the select lever when the manual gear shift mode is set.

The brake controller 9 controls various types of actuators serving as the brake-related actuators 14 on the basis of a detection signal from a predetermined sensor in the sensors and operators 17, operation input information by an operator, and the like. The brake-related actuator 14 includes various types of actuators related to a brake, such as a hydraulic control actuator to control an output fluid pressure from a brake booster to a master cylinder and a hydraulic pressure in a brake fluid pipe.

For example, when the driving support controller 5 gives an instruction to turn on a brake, the brake controller 9 controls the above-described hydraulic control actuator to brake the vehicle. Further, the brake controller 9 calculates a slip ratio of a wheel from detection information of a predetermined sensor (for example, an axle rotational speed sensor and a vehicle speed sensor), increases and decreases a hydraulic pressure by the above-described hydraulic control actuator according to the slip ratio, thereby realizing so-called antilock brake system (ABS) control.

The light controller 10 controls the headlight 15 to be turned on and off and controls the ADB actuator 16 on the basis of a detection signal from a predetermined sensor in the sensors and operators 17, operation input information by an operator, and the like.

Specifically, the light controller 10 performs automatic headlight control to turn on and off the headlight 15 on the basis of a detection signal by a predetermined sensor such as an illuminance sensor. Further, the light controller 10 also controls turning on and off the low beam and the high beam of the headlight 15 on the basis of operation input information by the above-described headlight switch 17D. In particular, the light controller 10 in the present implementation realizes the ADB function by controlling the ADB actuator 16 on the basis of an instruction from the light distribution control processor 5A in the driving support controller 5. The ADB actuator 16 in the present implementation is, for example, an actuator to drive a douser, and the douser is driven on the basis of control from the light controller 10, so as to form a shaded region in a part of a light distribution region of the high beam, or so as not to form a shaded region (i.e., the high beam is fully irradiated).

2. Summary of Processes Executed in Present Implementation

A summary of various types of processes executed in the present implementation will be described with reference to FIG. 2.

Figure 2:
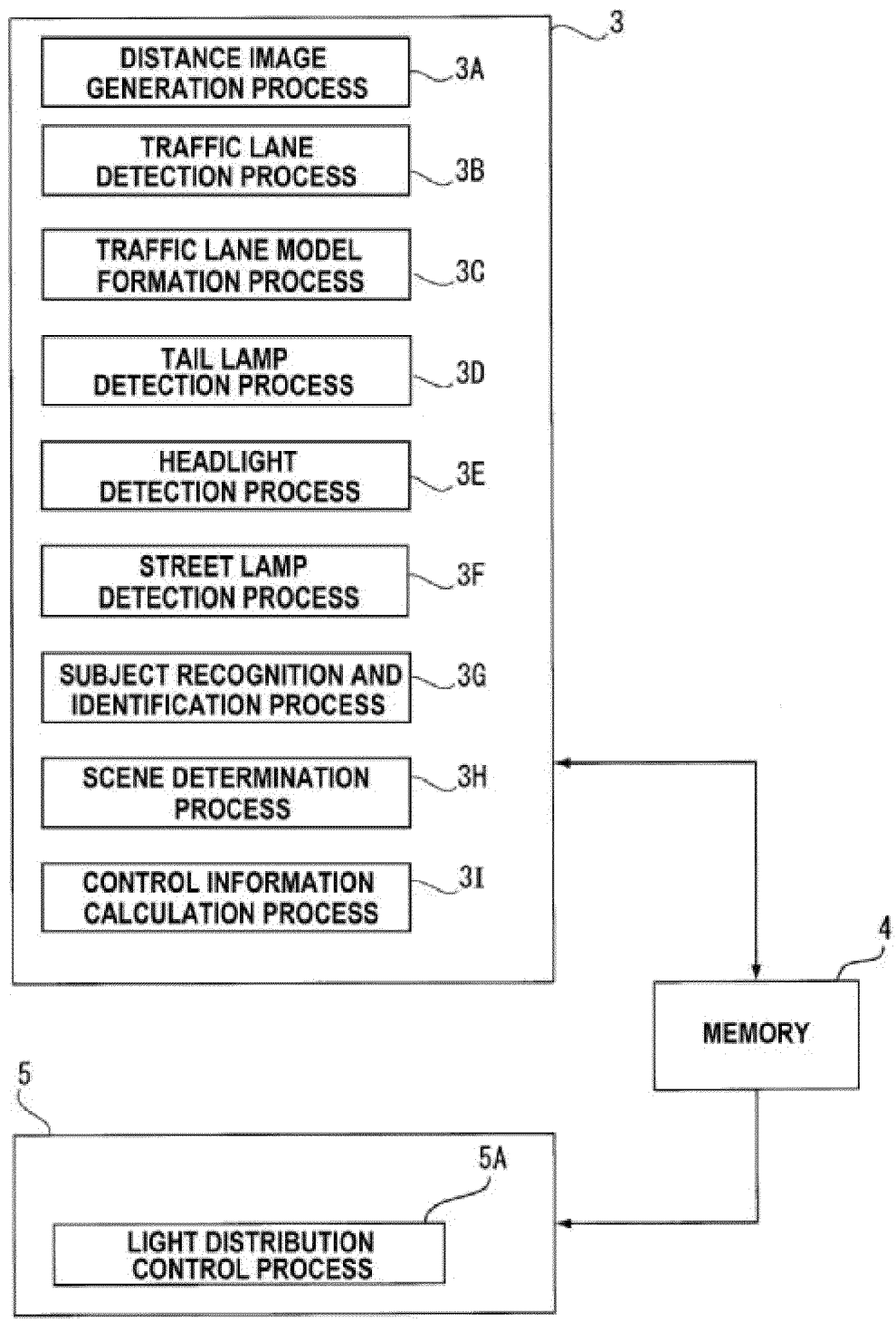
FIG. 2 is an explanatory diagram of a function configuration of an image processor and a driving support controller of a vehicle control system according to the implementation.

FIG. 2 illustrates various types of image processing executed by the image processor 3 on the basis of the first picture data and the second picture data as blocks by classifying the various types of image processing according to function. FIG. 2 also illustrates the light distribution control processor 5A included in the driving support controller 5.

As illustrated in the drawing, by rough classification according to function, the image processor 3 has a distance image generation processor 3A, a traffic lane detection processor 3B, a traffic lane model formation processor 3C, a tail lamp detection processor 3D, a headlight detection processor 3E, a street lamp detection processor 3F, a subject recognition and identification processor 3G, a scene determination processor 3H, and a control information calculation processor 3I.

In the image processor 3, a distance image generation process executed by the distance image generation processor 3A generates a distance image on the basis of the first picture data and the second picture data stored in the memory 4. Specifically, the distance image generation process generates distance image data obtained by detecting corresponding points of the first picture data and the second image data (in other words, a pair of picture data pieces obtained by stereo imaging) by pattern matching, calculating deviation of coordinates between the detected corresponding points as a parallax M, and indicating a distance to the point in a real space on a picture according to a principle of triangulation by using the parallax M.

A traffic lane detection process executed by the traffic lane detection processor 3B detects a traffic lane formed on a road surface on which the vehicle drives on the basis of a reference image (in other words, picture data set in advance out of the first picture data and the second picture data) and the distance image data (distance information per pixel as a corresponding point) generated in the above-described distance image generation process. Specifically, in the traffic lane detection process, firstly, lane line candidate points are detected on the reference image on the basis of a luminance value of each pixel of the reference image and a distance of each pixel in a real space, and positions of the right and left lane lines of the vehicle are detected on the basis of the detected lane line candidate points. For example, search is performed while offsetting by one pixel at a time in right and left directions on a horizontal line of one pixel width on the reference image, and a pixel satisfying a condition that a luminance differential value (=edge strength) of each pixel changes more greatly than a threshold value, is detected as the lane line candidate points on the basis of a luminance value of each pixel of the reference image. This process is sequentially performed while offsetting the above-described horizontal line to be searched by one pixel width at a time from the downside of the reference image upward, for example. Accordingly, the lane line candidate points are detected on each of a right-side region and a left-side region of the vehicle.

A traffic lane model formation process executed by the traffic lane model formation processor 3C forms a traffic lane model in a three-dimensional space defined by each axis of X, Y, and Z (the X axis is in the right and left directions, the Y axis is in a height direction, and the Z axis is in a traveling direction of the vehicle) on the basis of information on the right and left lane line candidate points detected in the above-described traffic lane detection. Specifically, the traffic lane model in the three-dimensional space is formed by applying collinear approximation to a position (X, Y, and Z) in the real space of the traffic lane candidate point detected by a traffic lane detector with, for example, a least squares method.

With the traffic lane model formed in this manner, height information on the road surface on which the vehicle runs is also obtained.

The method of each of the distance image generation process, the traffic lane detection process, and the traffic lane model formation process described above is similar to the method disclosed in JP-A No. 2008-33750, and see the document for more details.

The tail lamp detection processor 3D, the headlight detection processor 3E, the street lamp detection processor 3F, the subject recognition and identification processor 3G, the scene determination processor 3H, and the control information calculation processor 3I respectively execute a tail lamp detection process, a headlight detection process, a street lamp detection process, a subject recognition and identification process, a scene determination process, and a control information calculation process. These processes are processes for an ambient environment determination and headlight control of the present implementation. These respective processes will be described later in detail.

3. Bright Image and Dark Image, and Detection Range

Prior to the explanation on the processes for the ambient environment determination and the headlight control in the present implementation, two types of pictures (frame pictures) used in image recognition and a detection range of each subject will be described.

As described later, in the present implementation, the preceding vehicle and the oncoming vehicle are recognized as subjects which should not be irradiated with the high beam. The preceding vehicle is recognized on the basis of a detection result of a tail lamp thereof and the oncoming vehicle is recognized on the basis of a detection result of the headlight thereof.

The light volume of the headlight is greatly different from that of the tail lamp. Thus, in some cases, when pictures captured at a same shutter speed are used, clear images may not be detected for both of the headlight and the tail lamp. For example, in a picture captured at a shutter speed fitted to the tail lamp, luminance of the headlight may be saturated.

Therefore, in the present implementation, the shutter speed is changed for each frame, and a detection process of each subject is performed by a picture captured at the shutter speed fitted to the tail lamp and a picture capture at a shutter speed fitted to the headlight. Hereinafter, picture data captured at the shutter speed for the tail lamp (the shutter speed slower than that for the headlight) is mentioned as a "bright image G1", and picture data captured at the shutter speed for the headlight (the shutter speed faster than that for the tail lamp) is mentioned as a "dark image G2".

Figure 3A:
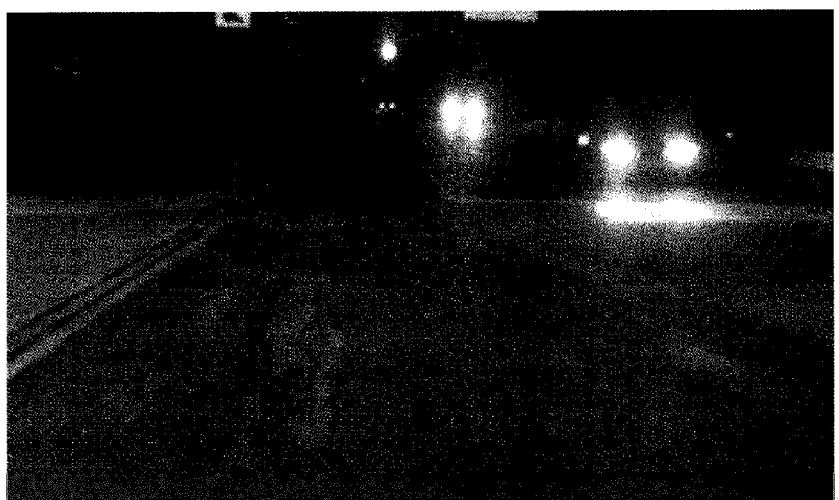
FIG. 3A and FIG. 3B are explanatory diagrams of a bright image and a dark image to be used in the implementation.
Figure 3B:
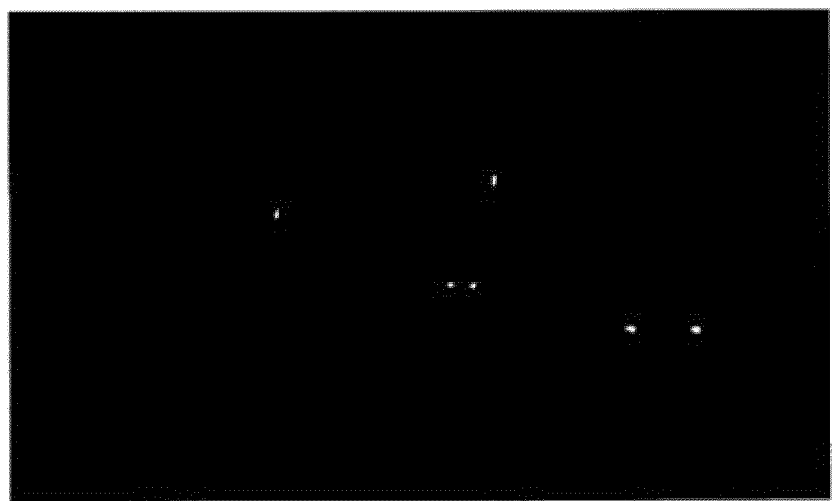

Examples of the bright image G1 and the dark image G2 captured for a same scene are illustrated in FIG. 3A and FIG. 3B, respectively.

The image processor 3 instructs the imager 2 so that the first camera 2A and the second camera 2B alternatively outputs the bright image G1 and the dark image G2, respectively. Accordingly, the first image data obtained by the first camera 2A and the second image data obtained by the second camera 2B respectively switch between the bright image G1 and the dark image G2 alternately for each frame period. The bright image G1 is captured at a shutter speed set by the automatic adjustment function described above. The dark image G2 is captured at a shutter speed obtained by giving a predetermined offset to the shutter speed of the bright image G1.

The above-described distance image is generated on the basis of the bright image G1.

In this case, the dark image G2 is used for detecting the headlight and also for the street lamp detection process by the street lamp detection processor 3F. Considering this point, the dark image G2 in the present implementation is offset in an upper direction than the bright image G1.

However, since the luminance of the street lamp on the picture is equal to somewhere between that of the headlight and that of the tail lamp, the street lamp detection may be performed by using the bright image G1, not necessarily by using the dark image G2.

In the present implementation, a detection range is defined for the tail lamp (the preceding vehicle), the headlight (the oncoming vehicle), and the street lamp. That is, a detection process for each of these subjects is not performed for all pixels of the bright image G1 and the dark image G2, but performed for each of a tail lamp detection range As as a range for the tail lamp detection process, a headlight detection range At as a range for the headlight detection process, and a street lamp detection range Ag as a range for the street lamp detection process.

Figure 4A:
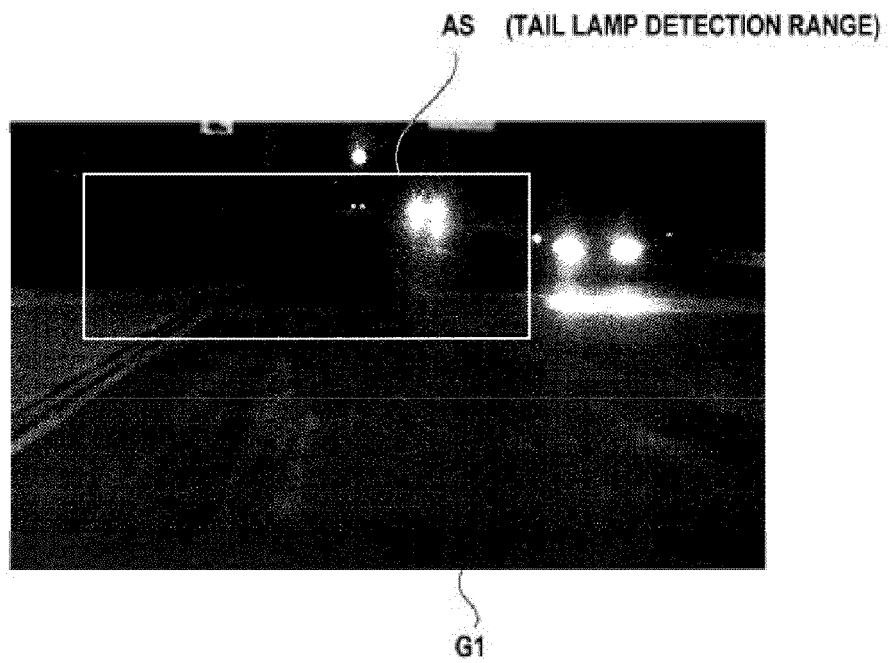
FIG. 4A and FIG. 4B are explanatory diagrams of a detection range in the implementation.
Figure 4B:
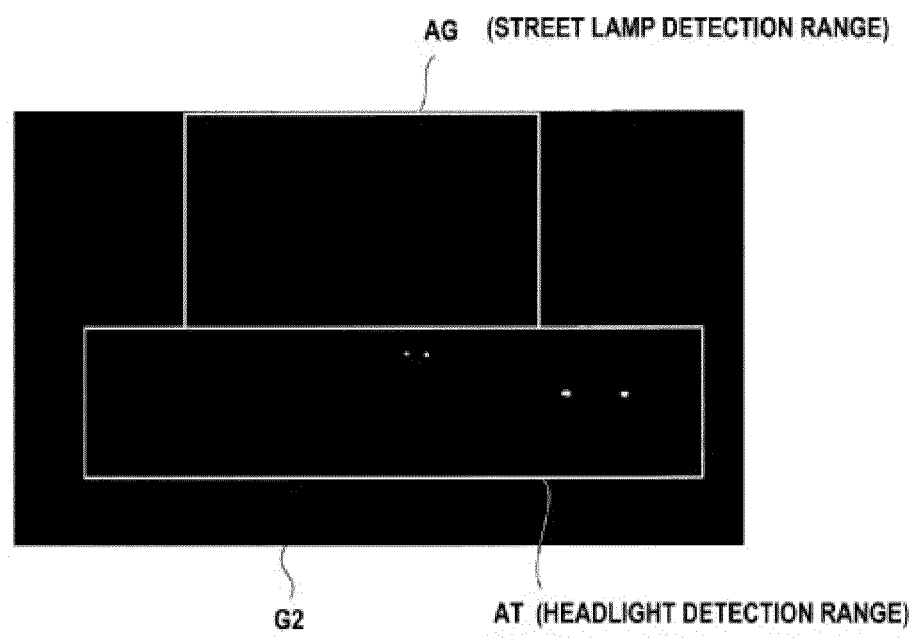

FIG. 4A illustrates an example of the tail lamp detection range As defined for the bright image G1, and FIG. 4B illustrates an example of the headlight detection range At and the street lamp detection range Ag defined for the dark image G2. Each of these detection ranges is set as a rectangle range. A position of each detection range is set so that a region in which a subject exists is included in an image.

Since each detection range of the tail lamp detection range As, the headlight detection range At, and the street lamp detection range Ag as described above is set, a range in which a subject is detected is limited, a process time is shortened, a process burden is reduced, and it is possible to prevent false detection in a place where a detection subject does not exist.

4. Overall Flow of Process

Figure 5:
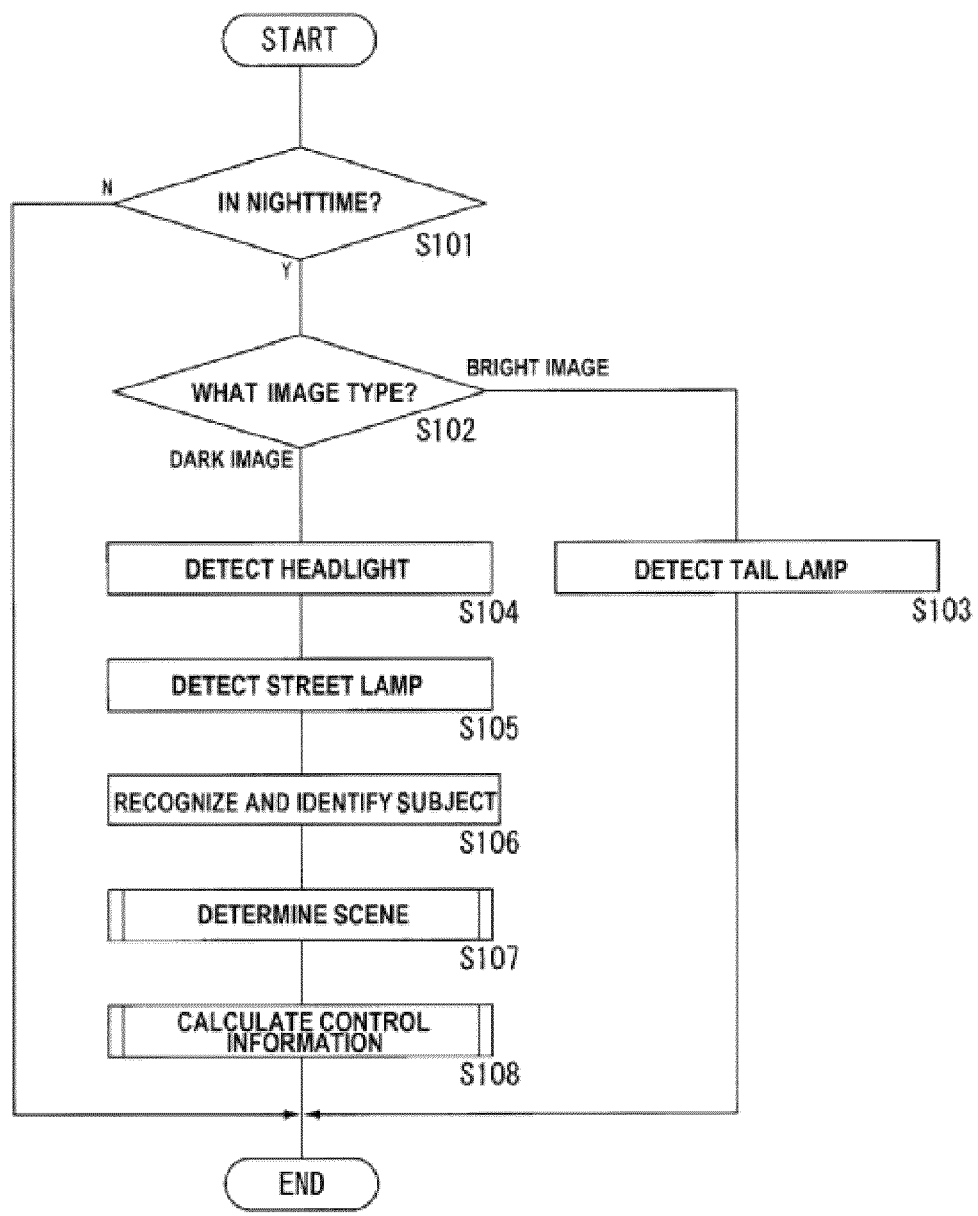
FIG. 5 is a flowchart of an environment determination and headlight control according to the implementation.

FIG. 5 is a flowchart illustrating an overall flow of a process related to image recognition in the implementation. A series of processes illustrated in FIG. 5 is repeatedly executed for each frame period by the image processor 3.

First, the image processor 3 determines whether or not it is in nighttime in step S101. When it is not in nighttime, it is not necessary to detect and recognize a subject, and therefore, it is determined whether or not it is necessary to detect and recognize a subject by a determination process of step S101.

Whether or not it is in nighttime is determined on the basis of the shutter speed and a gain value of the picture data. Alternatively, whether or not it is in nighttime may be determined on the basis of a result of determining whether or not the high beam is on.

In step S101, when a negative result that it is not in nighttime is obtained, the process in a current frame period is ended, and when a positive result that it is in nighttime is obtained, the flow proceeds to step S102.

In step S102, an image type is determined. That is, it is determined whether the picture data loaded from the imager 2 in the current frame period is the bright image G1 or the dark image G2.

When the image type is the bright image G1, the tail lamp detection process is executed in step S103, and afterwards the process in the current frame period is ended.

On the other hand, when the image type is determined to be the dark image G2, the headlight detection process is performed in step S104, and then the street lamp detection process is performed in step S105.

In subsequent step S106, the subject recognition and identification process is executed. The subject recognition and identification process, which will be described in detail later, recognizes and identifies the preceding vehicle, the oncoming vehicle, and the street lamp on the basis of a result of the tail lamp detection process executed in step S103, and results of the headlight detection process and the street lamp detection process respectively executed in steps S104 and S105.

After the subject recognition and identification process is executed, the scene determination process and the control information calculation process are executed respectively in step S107 and step S108, and the flow is ended.

Hereinafter, processes executed as steps S103 to S108 will be described, which are the tail lamp detection process, the headlight detection process, the street lamp detection process, the subject recognition and identification process, the scene determination process, and the control information calculation.

5. Tail Lamp Detection Process

The tail lamp detection process detects a region presumed as a tail lamp of the preceding vehicle (a tail lamp region). In this tail lamp detection process, first, the tail lamp detection range As is set for the bright image G1, and then red pixels are detected from pixels in the tail lamp detection range As. Then, the detected pixels are grouped to create an element group. Specifically, pixels in which a distance between the detected pixels is equal to or less than A1 pixel are grouped. For example, A1=1.5 pixel.

Then, a basic characteristic amount of the element group is calculated. The basic characteristic amount includes:

vertical and horizontal coordinates of the element group (a position of each side of by a rectangle surrounding the element group);

pixel number in the element group;

the maximum luminance value and the minimum luminance value in the element group; and an average parallax in the element group (an average value of parallaxes M of respective pixels in the element group).

For the parallax M, a value obtained by the distance image generation process described above is used.

Then, element groups are sorted on the basis of information on the basic characteristic amount of the element group. In other words, an element group having basic characteristic amounts other than the following setting conditions, is deleted:

Condition 1): each of a longitudinal size and a lateral size of the element group is equal to or less than B1 pixel. B1 is, for example, two pixels.

Condition 2): A pixel number in the element group is equal to or less than C1 pixel. C1 is, for example, two pixels.

Alternatively, an element group may be deleted if the size of an element group is extremely large. However, a threshold value in this case is changed according to a distance (the parallax M).

Figure 6A:
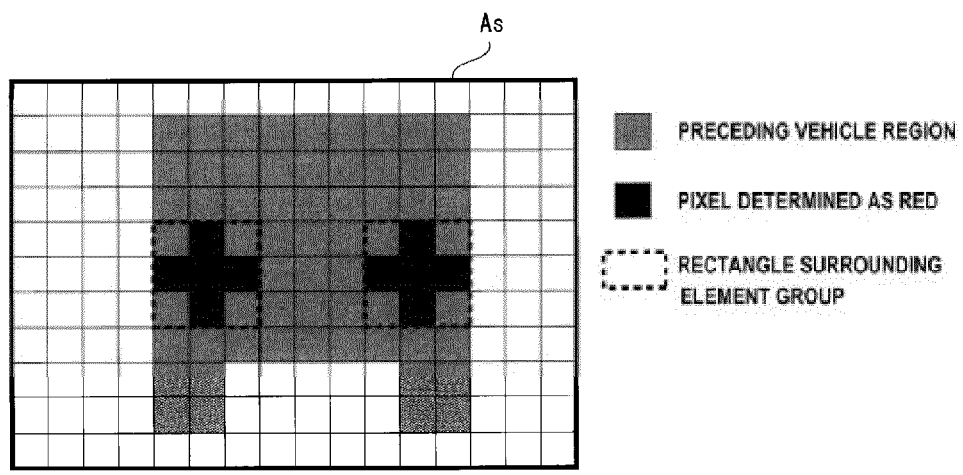
FIG. 6A and FIG. 6B are explanatory diagrams of an element group and an object group according to the implementation.

FIG. 6A illustrates a schematic diagram of an element group detected (finally sorted) by such a tail lamp detection process.

A region illustrated in gray in the drawing indicates a region corresponding to the preceding vehicle (a preceding vehicle region) in the tail lamp detection range As and each of regions illustrated in black indicates a region detected as a red pixel. According to the tail lamp detection process described above, rectangle regions illustrated with dashed lines in the drawing are grouped as element groups.

In this manner, the tail lamp detection process detects regions corresponding to tail lamp parts of the preceding vehicle as element groups.

As understood from the above description, the element group can be defined as a group obtained by grouping characteristic parts included in a subject which should be recognized. In the subject recognition and identification process, which will be described later, ranges of subjects which should be recognized are grouped as a subject group on the basis of a detection result of these element groups (see FIG. 6B).

6. Headlight Detection Process

The headlight detection process detects a region presumed as a headlight of the oncoming vehicle (a headlight region).

The basis flow of the headlight detection process is as follows:

i) A pixel in which the luminance value is equal to or more than a threshold value D2 is detected.

ii) Detected pixels are grouped to create an element group.

iii) A basic characteristic amount of the element group is calculated.

iv) The element groups are sorted.

In the process i), the headlight detection range At is set for the dark image G2, and a pixel in which the luminance value is equal to or more than D2 in this headlight detection range At is determined to be a candidate for the headlight region. In this case, the D2 is set to be a small value of, for example, around 5 to 10 in 256-level luminance. This is because it is necessary to detect the headlight even in a distant place (for example, several hundred meters away) where luminance is sufficiently small.

In this manner, when the pixel as the candidate for the headlight region is detected, the processes ii) to iv) are performed in the same way as the case of the tail lamp detection process. As a result, a region corresponding to the headlight part of the oncoming vehicle is detected as the element group.

7. Street Lamp Detection Process

The street lamp detection process detects a region presumed as the street lamp (a street lamp region).

The street lamp detection process is performed in the above-described order i) to iv) similarly to the headlight detection process. However, as the process i), a difference lies in that the street lamp detection range Ag is set for the dark image G2, and a pixel in which the luminance value is equal to or more than a predetermined value in this street lamp detection range Ag is determined as a candidate for the street lamp region.

When the pixel as the candidate for the street lamp region is detected, the processes i) to iv) are performed similarly, and, as a result, a region corresponding to the street lamp is detected as the element group.

8. Subject Recognition and Identification Process

The subject recognition and identification process recognizes and identifies the subjects (the preceding vehicle, the oncoming vehicle, and the street lamp) on the basis of the results of the tail lamp detection process, the headlight detection process, and the street lamp detection process described above.

The "recognition" mentioned above indicates recognizing a subject range. The "identification" indicates calculating probability (for example, reliability to be described later) as to whether or not an object existing within a "recognized" range is the subject, and sorting out as to whether or not the object is the subject on the basis of the probability.

The "recognition" process of the subject is performed by grouping, as a subject group, the respective element groups obtained by the tail lamp detection process, the headlight detection process, and the street lamp detection process on the basis of information on the basic characteristic amount.

When values of average parallaxes of the element groups are almost the same values, it is highly possible that these element groups constitute a same subject. Further, if these element groups constitute the same subject, it can be said that a vertical and horizontal separation distances of these element groups are within a predetermined range.

In the "recognition" process of the subject, the element groups in which the values of average parallaxes are regarded as the same as each other and the vertical and horizontal separation distances of these element groups are within a predetermined range, are grouped as the subject group. The "predetermined range" for the above-described separation distances is set variable according to the value of the average parallax, in consideration for the fact that the size of a subject in the picture is changed according to a distance from the vehicle to the subject.

Figure 6B:
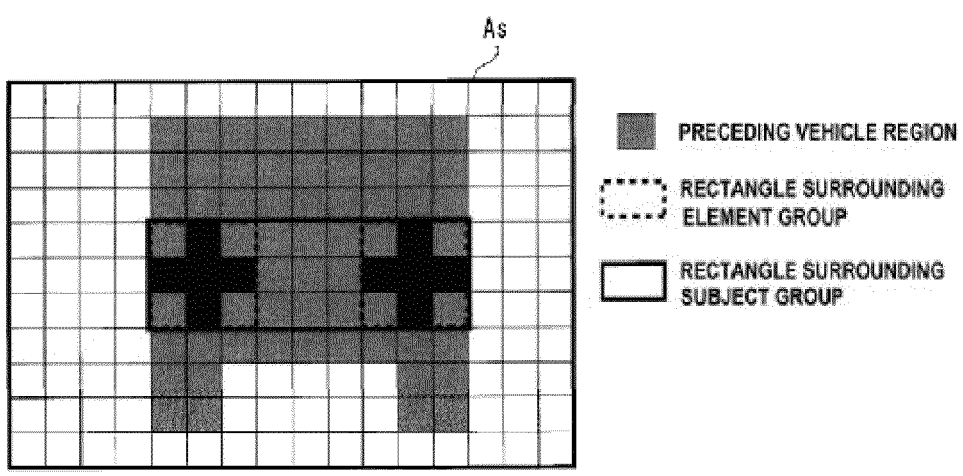

Such a "recognition" process achieves grouping of subject groups as illustrated in FIG. 6B. For example, ranges including glowing parts (each element group) on the right and left of the preceding vehicle or the oncoming vehicle are grouped as one subject group.

For the street lamp, since the element group itself as a glowing part is the subject which should be recognized, the above-described "recognition" process is not executed, and the element group may be treated as the subject group as is.

In the "identification" process of the subject, the reliability is calculated for each of the subject groups grouped in the above-described "recognition" process, and a subject group in which the reliability is equal to or more than a predetermined threshold value is extracted.

The reliability in the present implementation is calculated for each frame. In the "identification" process, for each frame, the reliability is compared with the above-described predetermined threshold value, and the subject group is extracted.

The reliability is calculated on the basis of, for example, information on the number of element groups constituting the subject group, the size of the subject group, and a height from the road surface. A value obtained by the above-described traffic lane model formation process is used for the height from the road surface.

By such an "identification" process, it is possible to sort out objects (a sign, a signboard, a reflector, and the like irradiated with a light of the vehicle) other than the subjects such as the preceding vehicle and the oncoming vehicle.

That is, a subject group recognized in the preceding vehicle detection range As is identified as the tail lamp of the preceding vehicle or another object.

Further, a subject group recognized in the oncoming vehicle detection range At is identified as the headlight of the oncoming vehicle or another object.

For the street lamp, the "identification" process is unrequired, and the object group may be treated as the "street lamp". However, the street lamp may be distinguished from a traffic light and from an object group having a character considered as that of an object other than the street lamp.

9. Scene Determination Process

Figure 7:
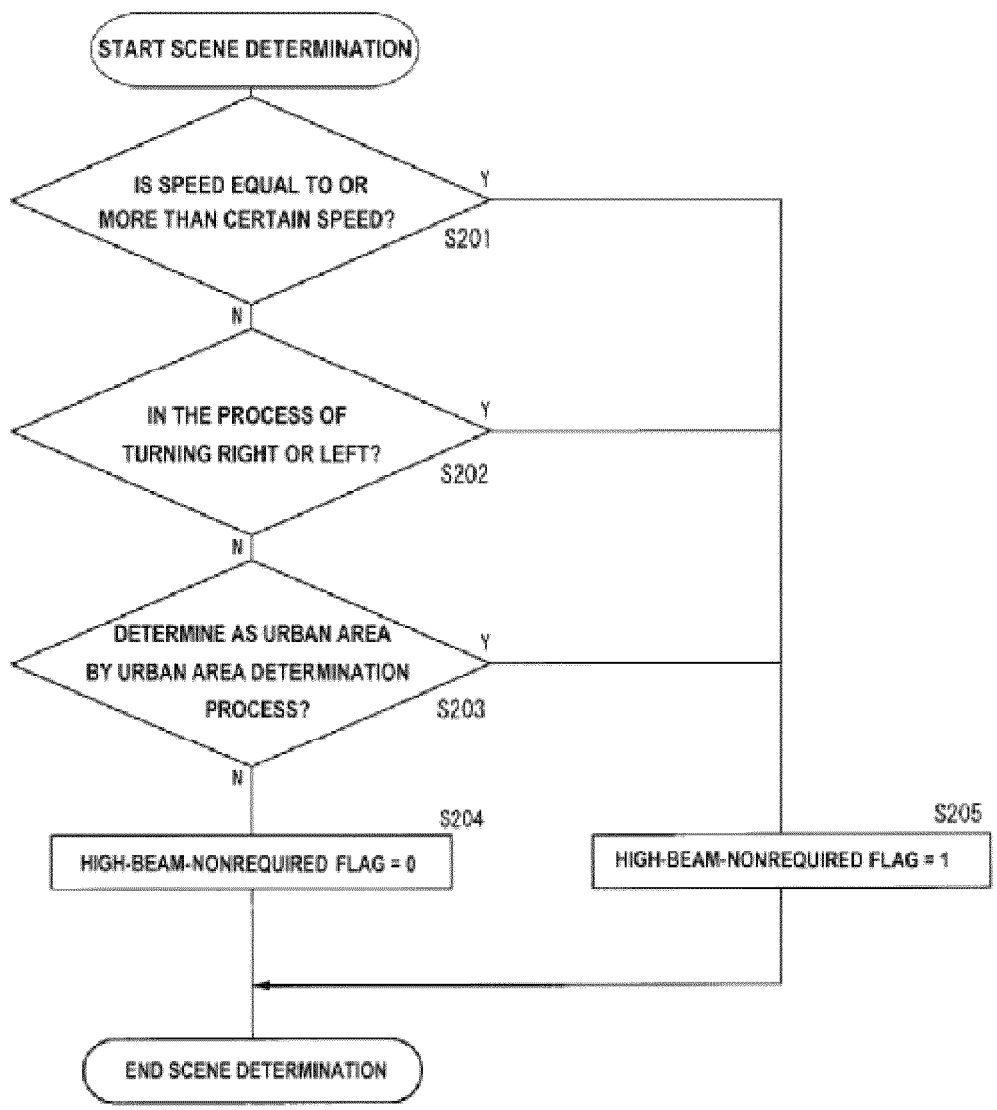
FIG. 7 is a flowchart of a scene determination process according to the implementation.
Figure 8:
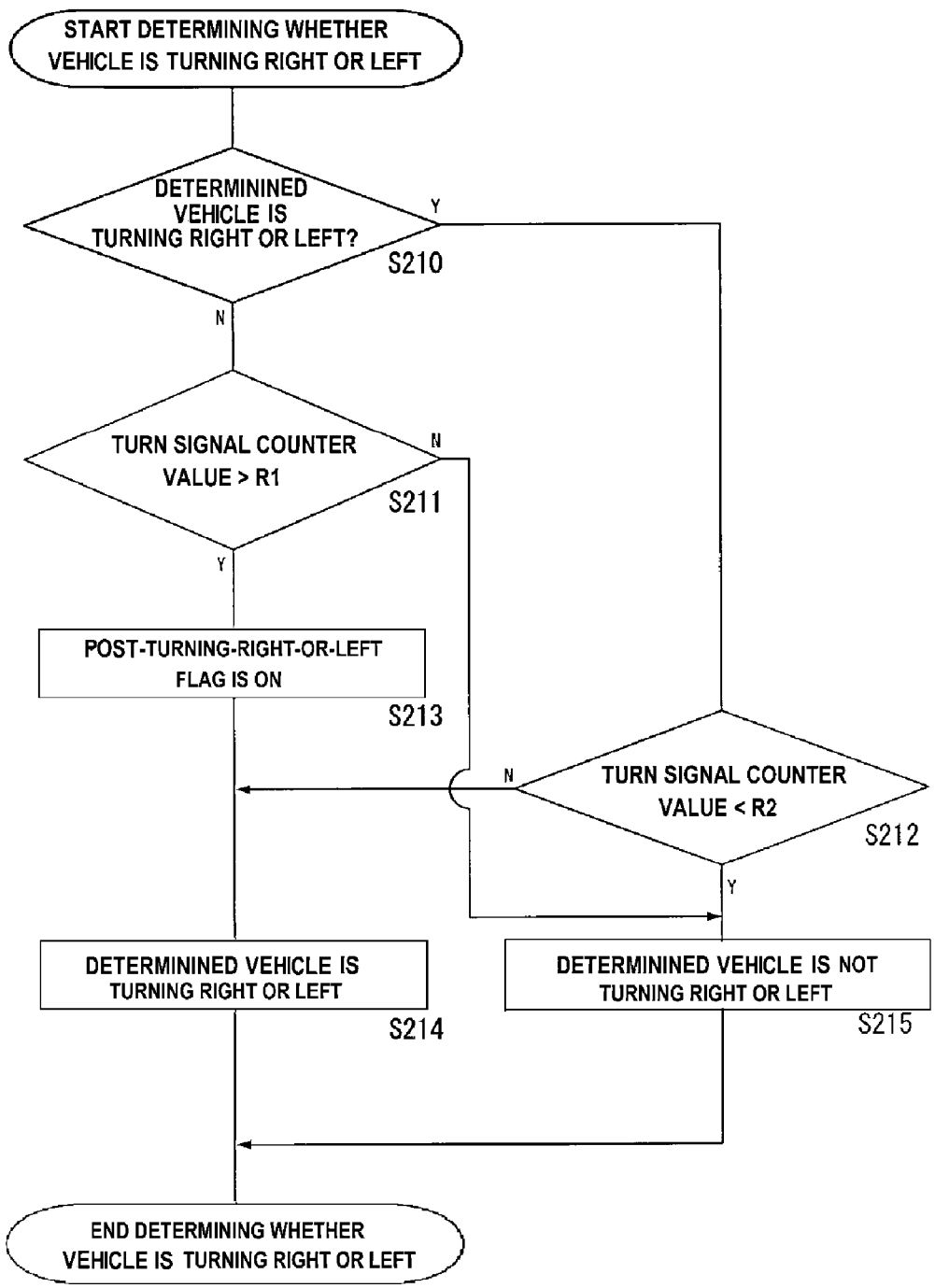
FIG. 8 is a flowchart of a process of determining whether the vehicle is turning right or left according to the implementation.
Figure 9:
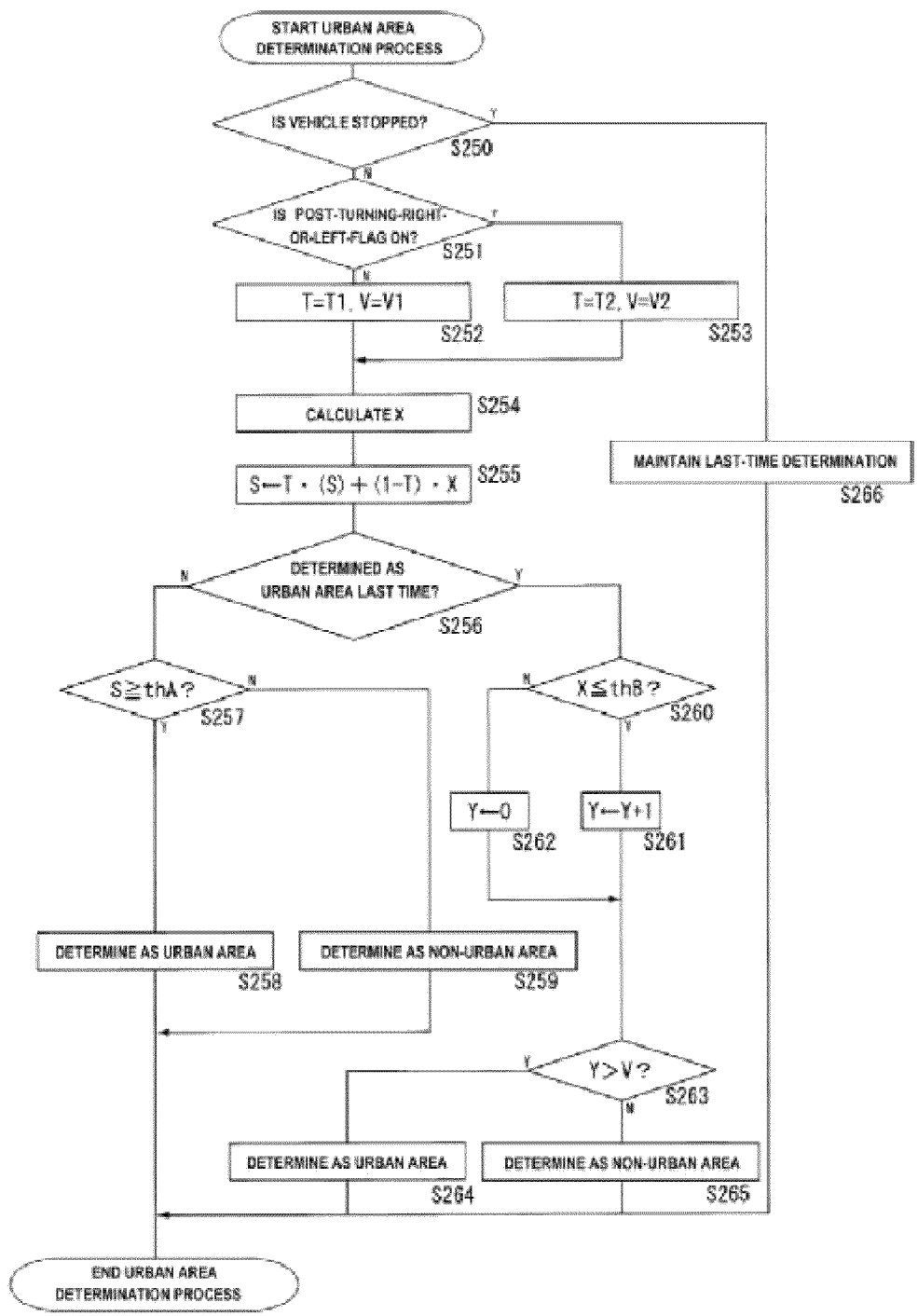
FIG. 9 is a flowchart of an urban area determination process according to the implementation.

FIG. 7 to FIG. 9 illustrate in detail the scene determination process executed as step S107 in FIG. 5. This scene determination process finally determines whether or not the current ambient environment and running condition of the vehicle are high-beam nonrequired scenes, and as an ambient environment determination, it is determined whether the ambient environment is an urban area or a non-urban area. This is because the urban area is sufficiently bright and is considered not to require the high beam. As for the running conditions, since low-speed running does not require a light to be applied to a distance place, the low-speed running condition is determined to be high-beam nonrequired scene. Further, since turning right or left does not require a light to be applied to a distance place, the turning conditions are determined to be high-beam nonrequired scenes.

FIG. 7 illustrates a scene determination process executed by the image processor 3 with a function as the scene determination processor 3H. In step S201, the image processor 3 detects whether or not the running speed of the vehicle is currently equal to or more than a given speed. For example, detection information of the vehicle speed sensor 17A is checked, and it is checked whether or not the speed is equal to or more than, for example, 20 km/h as the given speed.

When the running speed is less than the given speed, the image processor 3 proceeds to step S205, where the high-beam nonrequired scene is determined, and a high-beam-nonrequired flag is set to 1.

It is preferable that, hysteresis should be provided in order to prevent hunting of determination. For example, under a condition where the high-beam-nonrequired-flag is set to 1, the given speed in the determination in step S201 is changed from 20 km/h to 18 km/h, thereby preventing a frequent fluctuation of a determination result ("1" and "0" of the high-beam-nonrequired flag).

When it is detected that the running speed is equal to or more than a given speed, the image processor 3 determines whether or not the vehicle is currently turning right or left right or left in step S202. For example, if a lighting period of a turn signal is measured such that lighting (blinking) of the turn signal continues for a certain period, the vehicle is determined to be turning right or left. It is preferable that the hysteresis should be provided in this determination.

FIG. 8 illustrates one example of a process of determining whether the vehicle is turning right or left performed in step S202. In parallel with this process in FIG. 8, the image processor 3 is assumed to perform a process of incrementing an internal counter (for convenience sake, referred to as a "turn signal counter") when the turn signal blinks and decrementing (note that, the minimum value is zero) when the turn signal is off.

In step S210, the image processor 3 checks whether or not it is determined that the vehicle is currently turning right or left (whether being in a period after determination in step S213 to be described later).

When the vehicle is currently turning right or left, in step 211, it is checked whether or not a value of the turn signal counter exceeds a turning-right-or-left determination threshold value R1. The turning-right-or-left determination threshold value R1 is set to be, for example, a count value corresponding to five seconds.

When the value of the turn signal counter does not exceed the turning-right-or-left determination threshold value R1, the image processor 3 determines that the vehicle is not currently turning right or left in step S215.

On the other hand, when the value of the turn signal counter exceeds the turning-right-or-left determination threshold value R1, an post-turning-right-or-left flag is set to be on in step S213, and it is determined that the vehicle is currently turning right or left in step S214. The post-turning-right-or-left flag indicates a period after the right or left turn (a certain period after the right or left turn) to be checked in the urban area determination to be described later, and this post-turning-right-or-left flag continues to be on for a given time (for example, for 20 seconds).

When step S202 in FIG. 7 is performed after it is determined that the vehicle is turning right or left in step S214, the flow in FIG. 8 proceeds from step S210 to step S212. In step S212, the image processor 3 checks whether or not the value of the turn signal counter falls below a turning-right-or-left determination threshold value R2. The turning-right-or-left determination threshold value R2 is, for example, a count value corresponding to two seconds.

When the value of the turn signal counter does not fall below the turning-right-or-left determination threshold value R2, determination as to whether the vehicle is turning right or left is continued in step S214. When the value of the turn signal counter falls below the turning-right-or-left determination threshold value R2, in step S215, it is determined that the vehicle is not turning right or left, in other words, it is determined that turning right or left has been finished.

For example, as illustrated in this FIG. 8, it is determined whether the vehicle is turning. The turning-right-or-left determination threshold value R1>R2, the hysteresis is given to the determination process, whereby a frequent fluctuation in determination of whether the vehicle is turning right or left is prevented. In the drawing, whether turning right or left is determined by the turn signal lighting (blinking) period. Alternatively, for example, whether the vehicle is turning right or left may be determined by information from the steering angle sensor 17B or by a combination of the turn signal lighting period and the information from the steering angle sensor 17B. Further alternatively, a yaw rate detection result may be used for determining whether the vehicle is turning right or left.

In step S202 of FIG. 7, whether the vehicle is turning right or left is determined as illustrated in FIG. 8 described above, and when it is determined that the vehicle is turning right or left, the image processor 3 proceeds to step S205, where it is determined that the ambient environment is the high-beam-nonrequired scene and as the high-beam-nonrequired flag is set to 1.

When it is determined that the vehicle is not turning right or left, the image processor 3 performs the urban area determination process in step S203 to determine whether or not the current ambient environment is the urban area. When the ambient environment is determined to be the urban area in the urban area determination process, the image processor 3 proceeds to step S205, where it is determined that the ambient environment is the high-beam-nonrequired scene and as the high-beam-nonrequired flag is set to 1.

Further, when it is not determined that the ambient environment is the urban area in the urban area determination process, it is determined that the ambient environment is not the high-beam-nonrequired scene and the high-beam-nonrequired flag is set to 0 in step S204.

In other words, in the scene determination process in FIG. 7, with either one of the case where the running speed is less than a certain speed, the case where the vehicle is turning right or left, and the case where it is determined that the ambient environment is the urban area in the urban area determination process, the high-beam-nonrequired flag is set to 1, that is, it is determined that the ambient environment is the high-beam-nonrequired scene. On the other hand, when no condition is satisfied, the high-beam-nonrequired flag is set to 0, in other words, it is determined that the ambient environment is not the high-beam-nonrequired scene.

The urban area determination process in step S203 determines whether or not the ambient environment of the vehicle is the urban area in consideration of the time-series fluctuation by using both of the street lamp detection result of the current detection frame unit and the street lamp detection result of the past detection frame unit of the picture.

It is noted that the "frame detection unit" is one or more frames as a unit to obtain a detection result used for the scene determination process. Therefore, the "current detection frame unit" is not limited to the latest one frame of the picture. When the detection process is performed on the bright image G1 and the dark image G2 as described above, the frame detection unit indicates a unit of two-frame period of the bright image G1 and the dark image G2. Further, for example, in the case where detection results of two frames and three frames, for example, are averaged to perform a one-time scene determination process, the plurality of frames corresponds to the "frame detection unit".

Hereinafter, such an urban area determination will be described in detail.

In the urban area determination process, first, in order to determine that the vehicle enters the urban area from the non-urban area, a determination value S is prepared and updated as follows:

$$S = T \cdot (\text{the last-time } S) + (1-T) \cdot X$$

X=(the number of subject groups identified as a street lamp in the street lamp detection range Ag+U×the number of subject groups not identified as a preceding vehicle in the preceding vehicle detection range As+U×the number of subject groups not identified as an oncoming vehicle in the oncoming vehicle detection range At)

The "X" is the number of subject groups as a detection result of the current detection frame unit. In other words, the "X" is the sum of the number of subject groups of the street lamp and subject groups which are not identified as either one of the preceding vehicle and the oncoming vehicle, i.e., which may be the street lamp, in the preceding vehicle detection range As and the oncoming vehicle detection range At. The "U" is a weight parameter given to the detection result. In order to mainly determine the number of subject groups identified as the street lamp, the "U" is set to 1 or less (for example, 0.5). Accordingly, the "X" is a value in which the number of objects which may be the street lamp is slightly reflected in the number of objects recognized as the street lamp. For the sake of convenience, the "X" is referred to as a "street-lamp-number reflection value".

The "T" is a parameter set between 0 and 1 (hereinafter also referred to as a "coefficient T"), and is configured to set a weight of reflecting the detection result of each detection frame unit on a time series. The "T" is a coefficient of the last-time determination value S and the "1−T" is a coefficient of the number X of street lamps in the current detection frame unit. Thus, in the determination value S, as the coefficient T is closer to 0, the weight of the detection result of the current detection frame unit is larger, and as the coefficient T is closer to 1, the weight of the detection result of the past detection frame unit is larger. According to the above-described equation, "the last-time determination value S" also includes an element of the determination values S prior to the time before last, and thus, the determination value S reflects a short-term detection result as the coefficient T is closer to 0 and reflects a long-term detection result as the coefficient T is closer to 1.

The coefficient T may be set by assuming a period at, for example, a level of several tens of seconds.

However, for a certain period after the right or left turn (while the post-turning-right-or-left flag is on), the coefficient T is set to be smaller than that at the time of going straight (the determination value S is set to reflect a relatively short-term detection result). For example, the coefficient T is set to be a value obtained by assuming a period of around several seconds.

The determination value S described above reflects both of the detection result of the current detection frame unit and the detection result of the past detection frame unit.

When this determination value S is equal to or more than a predetermined threshold value thA (for example, thA=3), it is determined that the vehicle has enters the urban area from the non-urban area, in other words, the high-beam-nonrequired scene. When the determination value S is less than the threshold value thA, it is determined that the ambient environment is the non-urban area, in other words, is not the high-beam-nonrequired scene.

The determination value S is not updated while the vehicle is stopped. The reason is to prevent the determination result from shifting to the urban area from the non-urban area by mistake when the vehicle is stopped unintentionally in a place where a light source locally exists in the non-urban area.

The above-described street-lamp-number reflection value X is used in order to determine that the vehicle has entered the non-urban area from the urban area. When a state where the street-lamp-number reflection value X is equal to or less than a threshold value thB (for example, thB=3) continues a predetermined number of times or more, the determination result is shifted to the non-urban area.

Specifically, the number of consecutive times for the street-lamp-number reflection value X with the threshold value thB or less is called "Y", and when the number of consecutive times Y is equal to or more than a threshold value V, it is determined that the ambient environment is the non-urban area.

The threshold value V is normally set to be a corresponding value of around 10 seconds. However, for a certain period after the right or left turn (while the post-turning-right-or-left flag is on), the threshold value V is set to be shorter than normal (for example, a corresponding value of around three seconds).

FIG. 9 illustrates a specific example of such an urban area determination process.

In the urban area determination process, in step S250 of FIG. 9, the image processor 3 checks whether or not the vehicle is currently stopped. When the vehicle is stopped, the last-time determination is maintained in step S266. In addition, the determination value S is not updated.

When the vehicle is not stopped, it is checked in step S251 whether or not the post-turning-right-or-left flag is on. That is, it is checked whether or not the period after the right or left turn (for example, a period of 20 seconds after t is detected that the vehicle is turning right or left) described in FIG. 8.

When the post-turning-right-or-left flag is off, in step S252, the coefficient T is set to T1 and the threshold value V is set to V1. When the post-turning-right-or-left flag is on, in step S253, the coefficient T is set to T2, and the threshold value V is set to V2. Note that T1>T2, and V1>V2. This is to set the coefficient T1 and the threshold value V to be small in the period after the right or left turn so that the determination responsiveness as to the determination that the ambient environment is the urban area and the determination that the ambient environment is the non-urban area is made higher than normal (a period other than the period after the right or left turn).

In step S254, the image processor 3 calculates the street-lamp-number reflection value X based on the detection result of the current detection frame unit.

Then, in step S255, the image processor 3 calculates (updates) the determination value S based on the number X of street lamps, the coefficient T, and the last-time determination value S.

In step S256, the image processor 3 checks whether or not the last-time determination was the urban area. When the last-time determination was the non-urban area, this time it is determined whether the vehicle is remaining in the non-urban area or has entered the urban area. In this case, the image processor 3 proceeds to step S257 to compare the determination value S with the threshold value thA. When the determination value S is equal to or more than the threshold value thA, it is determined in step S258 that the vehicle has entered the urban area, i.e., the ambient environment is the urban area. When the determination value S is less than the threshold value thA, it is determined in step S259 that the vehicle is remaining in the non-urban area also this time, i.e., the ambient environment is the non-urban area is determined.

On the other hand, when the last-time determination was the urban area, this time it is determined whether the vehicle is remaining in the urban area or has entered the non-urban area. For the determination, firstly, the image processor 3 proceeds from step S256 to step S260 to compare the street-lamp-number reflection value X with the threshold value thB. When the street-lamp-number reflection value X is equal to or less than the threshold value thB, the value of the number of consecutive times Y is incremented in step S261. When the street-lamp-number reflection value X exceeds the threshold value thB, the value of the number of consecutive times Y is reset to be zero in step S262.

Accordingly, the value of the number of consecutive times Y indicates the number of consecutive times that the street-lamp-number reflection value X is determined to be equal to or less than the threshold value thB in step S260. When this number of consecutive times Y is compared with the threshold value V in step S263, and the number of consecutive times Y exceeds the threshold value V, it is determined in step S265 that the vehicle has entered the non-urban area, i.e., the ambient environment is the non-urban area. When the number of consecutive times Y does not exceed the threshold value V, it is determined in step S264 that the vehicle is remaining in the urban area this time, i.e., the ambient environment is the urban area.

In the case of a period after turning right, the coefficient T is set to T2, and the threshold value V is set to V2 in step S253.

Since the coefficient T is set to T2, the determination value S obtained in step S255 is weighted more as the frame detection unit is closer to the current detection frame unit, and reflects a relatively short-term time-series shift. In other words, a reflection level of the street lamp detection result of the past detection frame units is lowered and the current street lamp detection result is weighted, whereby, the determination value S is more easily determined to be equal to or more than the threshold value thA in step S257 when entering the urban area from the non-urban area. In other words, determination responsiveness at the time when the ambient environment shifts to the urban area from the non-urban area is enhanced.

Further, since the threshold value V is set to V2, it is determined in step S263 that the ambient environment is the non-urban area, even when the number of consecutive times Y is less than normal. Accordingly, when the ambient environment shifts to the non-urban area from the urban area, the non-urban area is relatively quickly determined. In other words, the determination responsiveness at the time when the ambient environment shifts to the non-urban area from the urban area is enhanced.

In this manner, in the period after the vehicle turns right or left, determination responsiveness as to the determination that the ambient environment is the urban area and the determination that ambient environment is the non-urban area is made higher than normal (a period other than the period after the right or left turn).

10. Control Information Calculation Process

The control information calculation process executed in step S108 of FIG. 5 calculates control information of the ADB on the basis of the recognition and identification result of the preceding vehicle and the oncoming vehicle by the recognition and identification process and the result of the scene determination process. The process will be described in detail with reference to the flowchart in FIG. 10.

Figure 10:
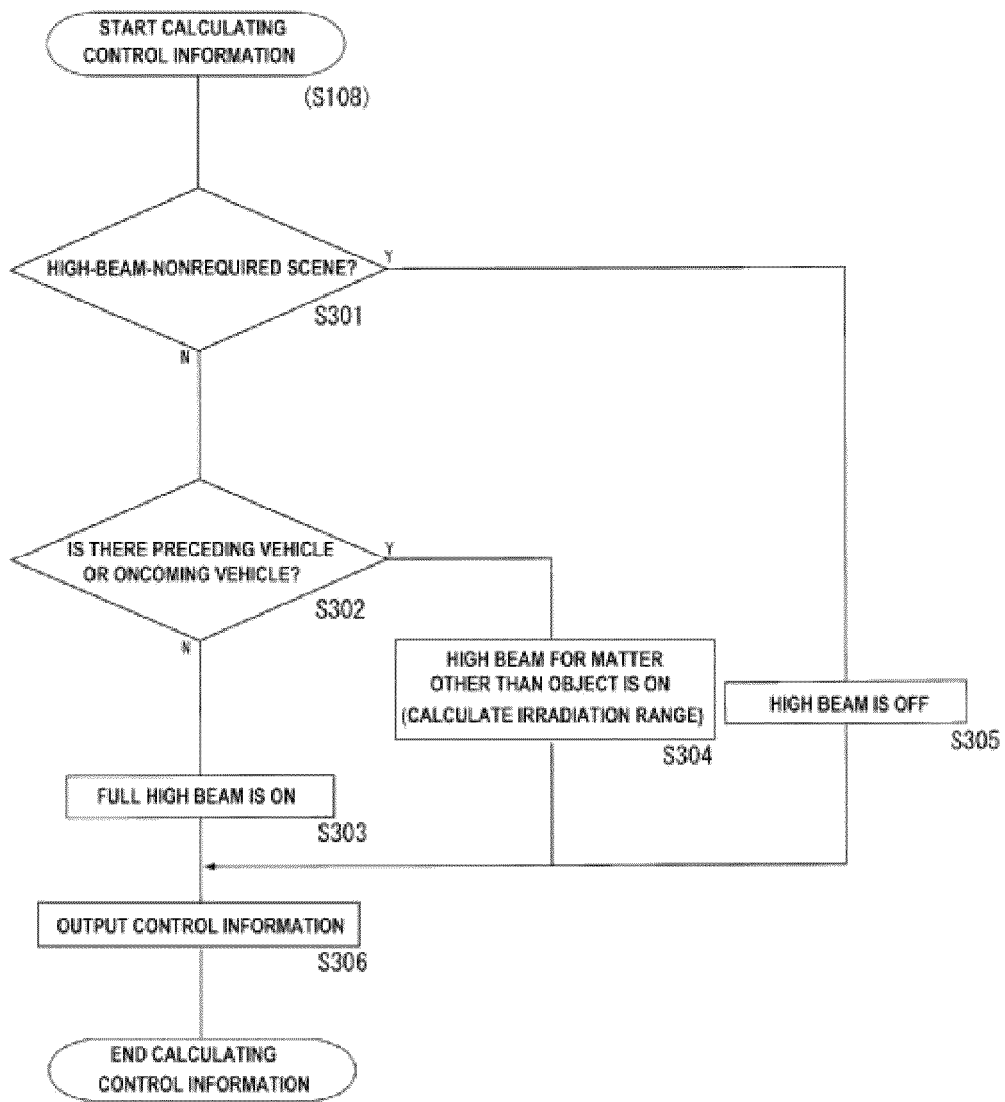
FIG. 10 is a flowchart of a control information calculation process according to the implementation.

In FIG. 10, the image processor 3 determines in step S301 whether or not the ambient environment is the high-beam-nonrequired scene (whether the high-beam-nonrequired flag is "1" or "0"), on the basis of the result of the scene determination process described above. When a positive result that the ambient environment is the high-beam-nonrequired scene is obtained, control information indicating that the high beam is off is generated in step S305, and the control information is output to the driving support controller 5 (the light distribution control processor 5A) in step S306. Then the process is ended.

On the other hand, when a negative result that that the ambient environment is not the high-beam-nonrequired scene is obtained, it is determined in step S302 whether or not either one of the preceding vehicle and the oncoming vehicle exists.

That is, on the basis of the result of the recognition and identification process described above, it is determined whether or not either one of the preceding vehicle and the oncoming vehicle exists.

When a negative result that neither the preceding vehicle nor the oncoming vehicle exists is obtained, control information is generated in step S303 to irradiate full high beam, and the control information is output to the driving support controller 5 in step S306. Then the process is ended.

Further, when a positive result that either one of the preceding vehicle and the oncoming vehicle exists is obtained, control information is generated in step S303 to irradiate high beam to an object other than the subjects is on. At this time, the image processor 3 calculates a range to which the high beam can be irradiated (hereinafter, information on the range is referred to as "irradiation range information") on the basis of the result of the recognition and identification process. The range to which the high beam can be irradiated is calculated by using horizontal coordinate information on the preceding vehicle and the oncoming vehicle.

The image processor 3 outputs the control information (including the irradiation range information) generated in step S304 to the driving support controller 5 in step S306. Then the process is ended.

11. Light Distribution Control on the Basis of Control Information

The driving support controller 5 (the light distribution control processor 5A) executes light distribution control on the basis of the above-described control information as a light distribution control process. Specifically, in response to the control information to turn off the high beam, the driving support controller 5 instructs the light controller 10 to turn off the high beam. In response to the control information to turn on the full high beam, the driving support controller 5 instructs the light controller 10 to turn on the full high beam. In response to the information to irradiate the high beam to the object other than the subject, the driving support controller 5 instructs the light controller 10 to irradiate the high beam only to a range in accordance with the irradiation range information included in the control information.

Figure 11A:
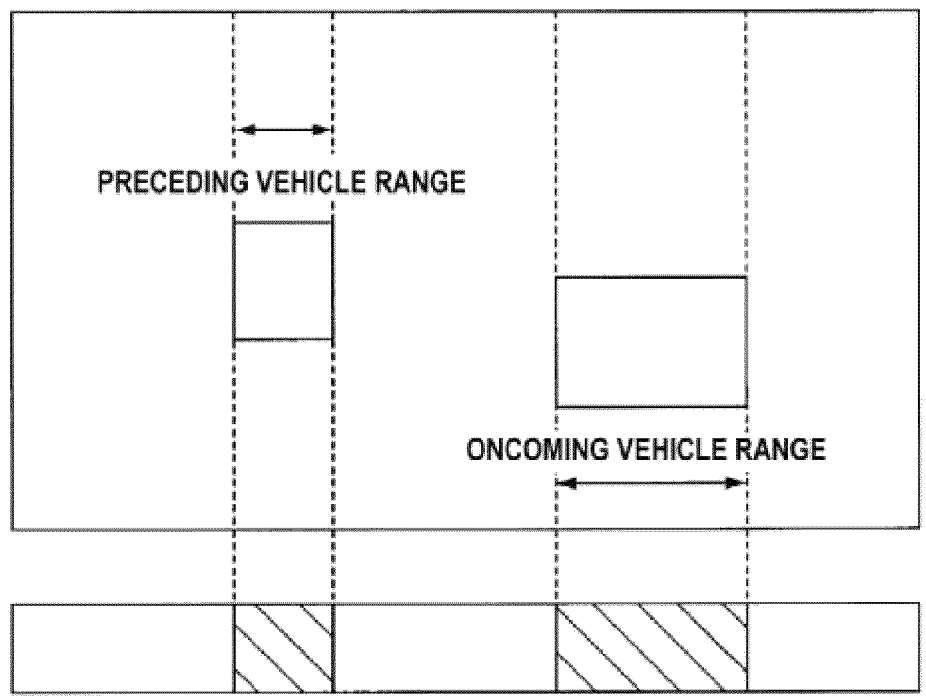
FIG. 11A and FIG. 11B are explanatory diagrams of high beam control in the implementation.
Figure 11B:
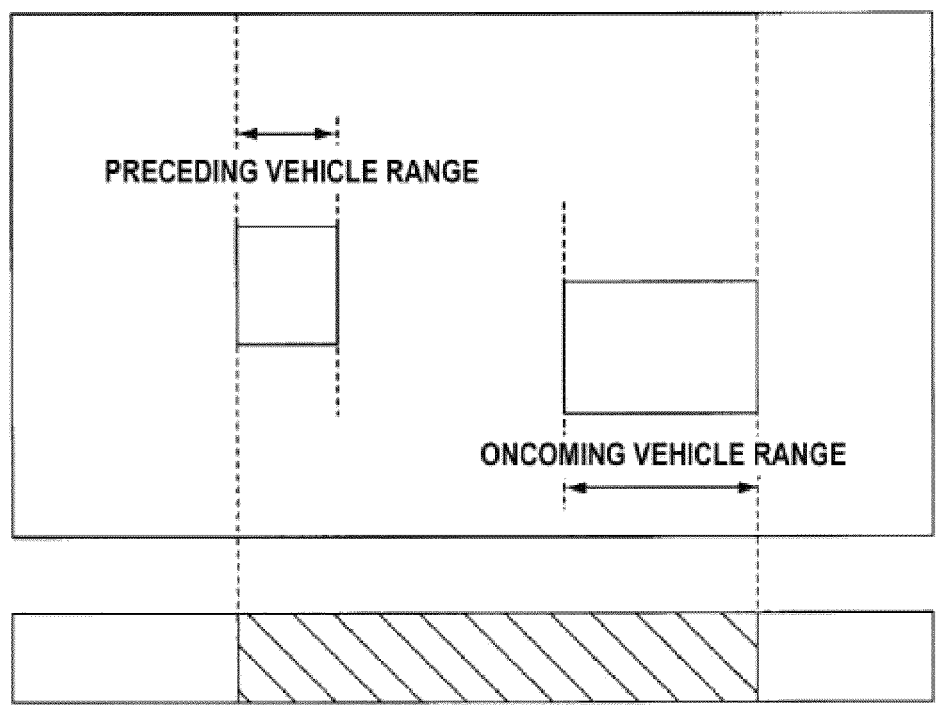

FIG. 11A and FIG. 11B are explanatory diagrams illustrating a mode of irradiating the high beam realized according to the control information to irradiate the high beam to the object other than the. The upper direction of the drawings indicates the forward direction of the vehicle.

As illustrated in FIG. 11A, the high beam is irradiated to a range other than ranges (shaded areas in the drawing) in which the preceding vehicle and the oncoming vehicle exist.

ADB may be configured to shade only one part from the high beam. In this case, when there are multiple subjects which should not be irradiated with the high beam and there is a range with no subject between the subjects as shown in FIG. 11A, light distribution is controlled as illustrated in FIG. 11B so that the range between the subjects (the preceding vehicle and the oncoming vehicle) which should not be irradiated with the high beam, is also set to be range to which the high beam should not be irradiated. To achieve this, for example, in the control information calculation process described above, when there are multiple subjects which should not be irradiated with the high beam, these subjects are grouped and irradiation range information is calculated based on the maximum coordinates in the horizontal direction of the group.

Figure 12:
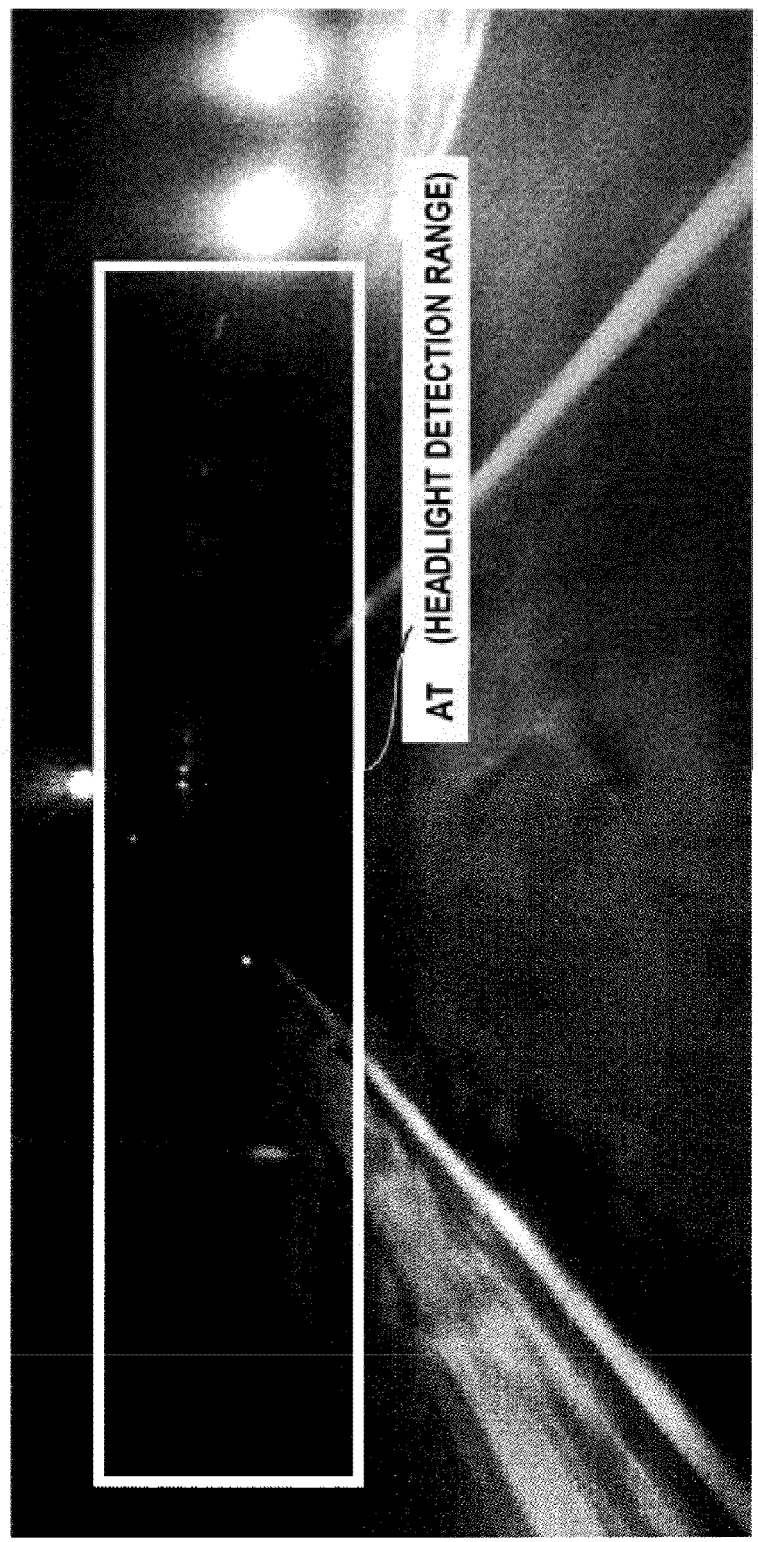
FIG. 12 is an explanatory diagram when a vehicle passes by an oncoming vehicle according to the implementation.

Regarding the subjects which should not be irradiated with the high beam, the oncoming vehicle goes out of the headlight detection range At when coming close to the vehicle to a certain extent, (see FIG. 12). Thus, when it is confirmed that the oncoming vehicle comes close to a certain distance (for example, 50 m: provided that the distance is within a distance that can be detected in the headlight detection range At), irradiation with the high beam to the direction that the oncoming vehicle is expected to pass the vehicle, is turned off for a certain period (for example, one second).

12. Summary and Modification

As described above, in the implementation, the configuration of the ambient environment determination apparatus is realized mainly by the functions of the imager 2 and the image processor 3. The imager 2 obtains a picture by capturing an area ahead of the vehicle. The image processor 3 includes the street lamp detection processor 3F to at least perform the street lamp detection for each detection frame unit of the picture and the scene determination processor 3H (the environment determination processor) to perform the urban area determination process of determining whether or not the ambient environment of the vehicle is the urban area by using both of the street lamp detection result of the current detection frame unit and the street lamp detection result of the past detection frame unit of the picture.

Therefore, basically, the urban area determination in consideration of the time-series fluctuation is performed by also reflecting the detection result of the past detection frame unit as well as the current detection frame unit. This enables stable determination of the urban area and the non-urban area. That is, it is possible to avoid erroneous determinations that the non-urban area is determined to be the urban area because of a temporary increase in the number of street lamps, and the like, and that on the other hand, the urban area is determined to be the non-urban area because of a temporary decrease in the number of street lamps. It is also possible to avoid a frequent fluctuation of the determination results.

The ambient environment (the urban area and the non-urban area) may change abruptly after the vehicle turns right or left. Therefore, in the urban area determination process executed by the scene determination processor 3H, the determination responsiveness with regard to the determination that the ambient environment is the urban area and the determination that ambient environment is the non-urban area in the predetermined period after the vehicle turns right or left is made higher than that in other periods. For example, normally, the coefficient T is set to T1 and the threshold value V is set to V1 while the coefficient T is set to T2 and the threshold value V is set to V2 in the period after the vehicle turns right or left, whereby the determination responsiveness is enhanced. As a result, the quick determination is executed in response to a change in an ambient situation after the right or left turn.

FIG. 13A schematically illustrates street lamps detected on a time axis, FIG. 13B illustrates a case where the determination responsiveness is not changed in the period after the right or left turn, and FIG. 13C illustrates a case where the determination responsiveness is changed in the period after the right or left turn like the present implementation.

Each of time points t1 and t2 indicates a time point when a road condition changes after the right or left turn. In the case of FIG. 13B in which the determination responsiveness is not changed, a reaction delay occurs as indicated by arrows P4 and P5. When the determination responsiveness is changed, the reaction delay is improved as indicated by arrows P4' and P5' in FIG. 13C.

For example, when a running scene is switched such that the vehicle enters a road requiring the high beam after a right or left turn from an urban road not requiring the high beam, a driver wants the high beam to be uses as quickly as possible. Thus, it is preferable to switch the determination of the urban area or the non-urban-area more quickly than that at the time of normal running. Such a circumstance can be addressed by increasing the determination responsiveness in the period after the right or left turn.

Further, in the implementation, while the vehicle is stopped, the determination value S is not updated, and therefore, the last-time determination result is maintained. This makes it possible to avoid erroneous determination in such a case where the vehicle is stopped unintentionally in a place with a lamp in the non-urban area, thereby improving the reliability of the determination.

Further, in the implementation, the determination responsiveness is enhanced by lowering the reflection level of the street lamp detection result of the past detection frame unit in the period after the vehicle turns right or left. Specifically, the coefficient T to T1 and T2 are changed. In other words, when observing the time-series fluctuation, the current street lamp detection result is weighted, whereby it is possible to execute a relatively short-term determination, and thus the determination responsiveness can be enhanced.

Further, in the implementation, the determination responsiveness is enhanced by lowering the threshold value to be compared with the value of the street lamp detection result of the period after the vehicle turns right or left. Specifically, the threshold value V is changed to V1 and V2. The determination responsiveness can be enhanced by lowering the threshold value V as the reference of comparison.

There may be other methods of enhancing the determination responsiveness by setting a threshold value after the right or left turn. For example, in steps S252 and S253 of FIG. 9, the threshold value thA used in step S257 and the threshold value thB used in step S260 may be set to be variable.

Needless to say, both of the coefficient T and the threshold value thA and both of the threshold value V and the threshold value thB may be changed in the period after the right or left turn.

Further, in the urban area determination process of the implementation, the ambient environment is determined to be the urban area when the value obtained by averaging, with predetermined weighting, each of the value of the street lamp detection result of the current detection frame unit and the value of the street lamp detection result of the past detection frame unit (in other words, the determination value S), is equal to or more than the predetermined threshold value thA (step S257). The determination value S is generated by giving predetermined weighting to and averaging the values of the street lamp detection results in the current and the past detection frame units and compared with the threshold value thA, whereby determination incorporating elements of the time-series fluctuation can be realized, contributing to stability of the determination and improvement of the reliability.

Further, in the urban area determination process of the implementation, the ambient environment is determined to be the non-urban area when the value of the street lamp detection result of each detection frame unit is equal to or less than the threshold value for the non-urban area determination (thB) consecutively the predetermined number of times (Y>V), after the ambient environment is determined as the urban area. This prevents the ambient environment from being automatically determined to the non-urban area after the ambient environment is determined to be the urban area, thereby ensuring stability of the determination.

Further, the implementation employs the light distribution controller (the control information calculation processor 3I and the light distribution controller 5A) to perform control so as not to execute the high beam irradiation of the headlight when the current ambient environment of the vehicle is determined as the urban area. This makes it possible to turn off high beam when the running scene is determined to be the urban area, thereby realizing an appropriate high beam light distribution in operations of the AHB and the ADB.

In the implementation, the number of street lamps detected in the street lamp detection range Ag set in the frame of the picture, is used as the street lamp detection result (see the street-lamp-number reflection value X). In place of the number or in addition to the number, the ratio of the street lamp region in the street lamp detection range Ag may be used as the street lamp detection result. The number of street lamps and the ratio of the street lamp region in the picture are important elements to distinguish the urban area from the non-urban area, and thus, accurate urban area determination is possible by using such a street lamp detection result.

Further, the number of detected objects which are not identified as the preceding vehicle in the preceding vehicle detection range As and the number of detected objects which are not identified as the oncoming vehicle in the oncoming vehicle detection range At are also regarded as elements of the street-lamp-number reflection value X. A detected object other than the preceding vehicle in the preceding vehicle detection range As (for example, an object with high luminance), and a detected object other than the oncoming vehicle in the oncoming vehicle detection range At (for example, the object with high luminance) are considered to be a light in the urban area, and the like, and can be an element to distinguish the urban area from the non-urban area. Determination by taking these elements into consideration can enhance accuracy of the urban area determination.

The ratio of a detected-object region in the preceding vehicle detection range As and the ratio of a detected-object region in the oncoming vehicle detection range At may be add, to the determination elements.

In the urban area determination process, there may be an case in which detection result information (detected subject group information) in the preceding vehicle detection range As and the oncoming vehicle detection range At is not used. That is, only a subject group in the street lamp detection range Ag may be used.

For example, for the determination value S=T×(the last-time S)+(1−T)·X described above in the urban area determination process, the street-lamp-number reflection value X may be obtained by the equation, X=(the number of subject groups identified as the street lamp in the street lamp detection range Ag).

Further, more varieties of modifications can be assumed for a specific configuration and an operation of the present invention.

In the above-described implementation, a stereo camera system using the first camera 2A and the second camera 2B in FIG. 1 serves as the imager to obtain a picture obtained capturing an area ahead of the vehicle. Alternatively, the urban area determination may be performed with an imager having one camera.

Further, while the bright image G1 and the dark image G2 are sequentially obtained in order to detect the street lamp, the tail lamp, and the headlight in the implementation, such images obtained at different shutter speeds may not be obtained. Further, from the imager 2, an image for detecting the street lamp, an image for detecting the tail lamp, and an image for detecting the headlight obtained at different shutter speeds, may be obtained.

A specific method of the urban area detection process is not limited to the process in FIG. 9.

The present invention can be applied to a process provided that the process performs determination by using the street lamp detection results in the current and past frame detection units.

For example, in the process of determining that the ambient environment is the urban area when the number of street lamps detected in a period of a plurality of detection frame units as a certain time exceeds a predetermined number, the above-described predetermined number in the period after the right or left turn may be reduced, the value of the above-described predetermined time in the period after the right or left turn may be shortened. Either case is possible as far as the determination responsiveness is made higher in the period after the right or left turn.

In the implementation, the period after the right or left turn is assumed to be a period of 20 seconds from the detection that the vehicle is turning right or left (the period during which the post-turning-right-or-left flag is on), but the period after the right or left turn is not limited to 20 seconds. Further, according to a situation, the length of the period after the right or left turn can be varied. For example, the period after the right or left turn may be changed according to the vehicle speed, the acceleration condition, and the like in the period after the right or left turn.

In the implementation, as the scene determination process, the speed determination process, the process of determining whether the vehicle is turning right or left, and the urban area determination process are performed as illustrated in FIG. 7. However, for the ambient environment determination apparatus of the present invention, it is sufficient if at least the urban area determination process is performed.

Further, while FIG. 10 illustrates the case where the scene determination result is applied to the ADB, the scene determination result is also applicable to the Auto High Beam (AHB) which is, control to turn off the high beam in the case where either one of the preceding vehicle and the oncoming vehicle exists and in the high-beam-nonrequired scene. Specifically, in the case of the AHB, when either one of the preceding vehicle and the oncoming vehicle is detected in step S302 of FIG. 10, control may be performed to turn off the high beam in step S305 (step S304 is not performed).

The invention claimed is:

1. An ambient environment determination apparatus, comprising:
   an imager that obtains a picture capturing an area ahead of an vehicle;
   a detection processor that detects at least a street lamp for each detection frame unit of the picture; and
   an environment determination processor that performs an urban area determination process of determining whether or not the ambient environment of the vehicle is an urban area based on both of a street lamp detection result of a current detection frame unit and a street lamp detection result of a past detection frame unit of the picture, wherein
   in a period after the vehicle turns right or left, the environment determination processor enhances determination responsiveness with regard to the determination whether the ambient environment is the urban area or a non-urban area, than that in a period other than the period after the right or left turn, by lowering a reflection level of the street lamp detection result of the past detection frame unit.

2. The ambient environment determination apparatus according to claim 1, wherein the environment determination processor does not update an urban area determination result while the vehicle is stopped.

3. The ambient environment determination apparatus according to claim 1, wherein the environment determination processor enhances the determination responsiveness by lowering a threshold value to be compared with a value of the street lamp detection result of the period after the vehicle turns right or left.

4. The ambient environment determination apparatus according to claim 2, wherein the environment determination processor enhances the determination responsiveness by lowering a threshold value to be compared with a value of the street lamp detection result of the period after the vehicle turns right or left.

5. The ambient environment determination apparatus according to claim 1, wherein, in the urban area determination process, the ambient environment is determined to be the urban area when a value obtained by averaging, with predetermined weighting, a value of the street lamp detection result of the current detection frame unit and a value of the street lamp detection result of the past detection frame unit, is equal to or more than a predetermined threshold value.

6. The ambient environment determination apparatus according to claim 2, wherein, in the urban area determination process, the ambient environment is determined to be the urban area when a value obtained by averaging, with predetermined weighting, a value of the street lamp detection result of the current detection frame unit and a value of the street lamp detection result of the past detection frame unit, is equal to or more than a predetermined threshold value.

7. The ambient environment determination apparatus according to claim 4, wherein, in the urban area determination process, the ambient environment is determined to be the urban area when a value obtained by averaging, with predetermined weighting, a value of the street lamp detection result of the current detection frame unit and a value of the street lamp detection result of the past detection frame unit, is equal to or more than a predetermined threshold value.

8. The ambient environment determination apparatus according to claim 1, wherein, in the urban area determination process, the ambient environment is determined to be the non-urban area when the ambient environment is determined as the urban area and afterwards the value of the street lamp detection result of each detection frame unit is equal to or less than a threshold value for non-urban area determination consecutively a predetermined number of times.

9. The ambient environment determination apparatus according to claim 2, wherein, in the urban area determination process, the ambient environment is determined to be the non-urban area when the ambient environment is determined as the urban area and afterwards the value of the street lamp detection result of each detection frame unit is equal to or less than a threshold value for non-urban area determination consecutively a predetermined number of times.

10. The ambient environment determination apparatus according to claim 4, wherein, in the urban area determination process, the ambient environment is determined to be the non-urban area when the ambient environment is determined as the urban area and afterwards the value of the street lamp detection result of each detection frame unit is equal to or less than a threshold value for non-urban area determination consecutively a predetermined number of times.

11. The ambient environment determination apparatus according to claim 1, further comprising:
a light distribution controller to perform control so as not to execute high beam irradiation of a headlight when the environment determination processor determines that a current ambient environment of a vehicle is the urban area.

12. The ambient environment determination apparatus according to claim 2, further comprising:
a light distribution controller to perform control so as not to execute high beam irradiation of a headlight when the environment determination processor determines that a current ambient environment of a vehicle is the urban area.

13. The ambient environment determination apparatus according to claim 4, further comprising:
a light distribution controller to perform control so as not to execute high beam irradiation of a headlight when the environment determination processor determines that a current ambient environment of a vehicle is the urban area.

* * * * *